Sept. 12, 1950  C. D. RYAN ET AL  2,521,749
POSTAGE METER LOADING MECHANISM
Filed June 16, 1944  12 Sheets-Sheet 1
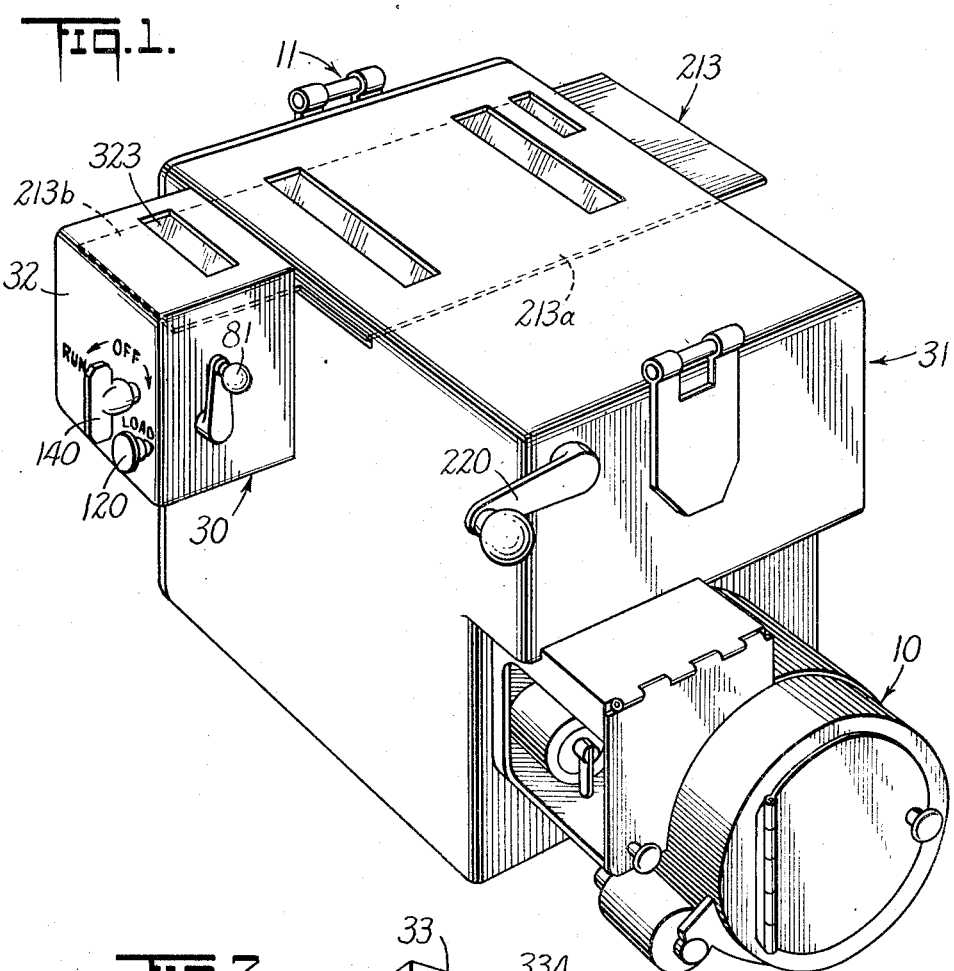
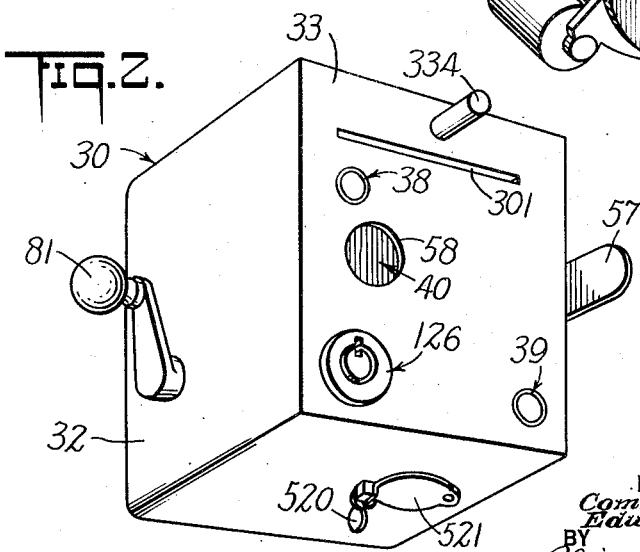
INVENTORS
Commodore D. Ryan
Edward P. Drake
BY
Blair, Curtis + Hayward
ATTORNEYS

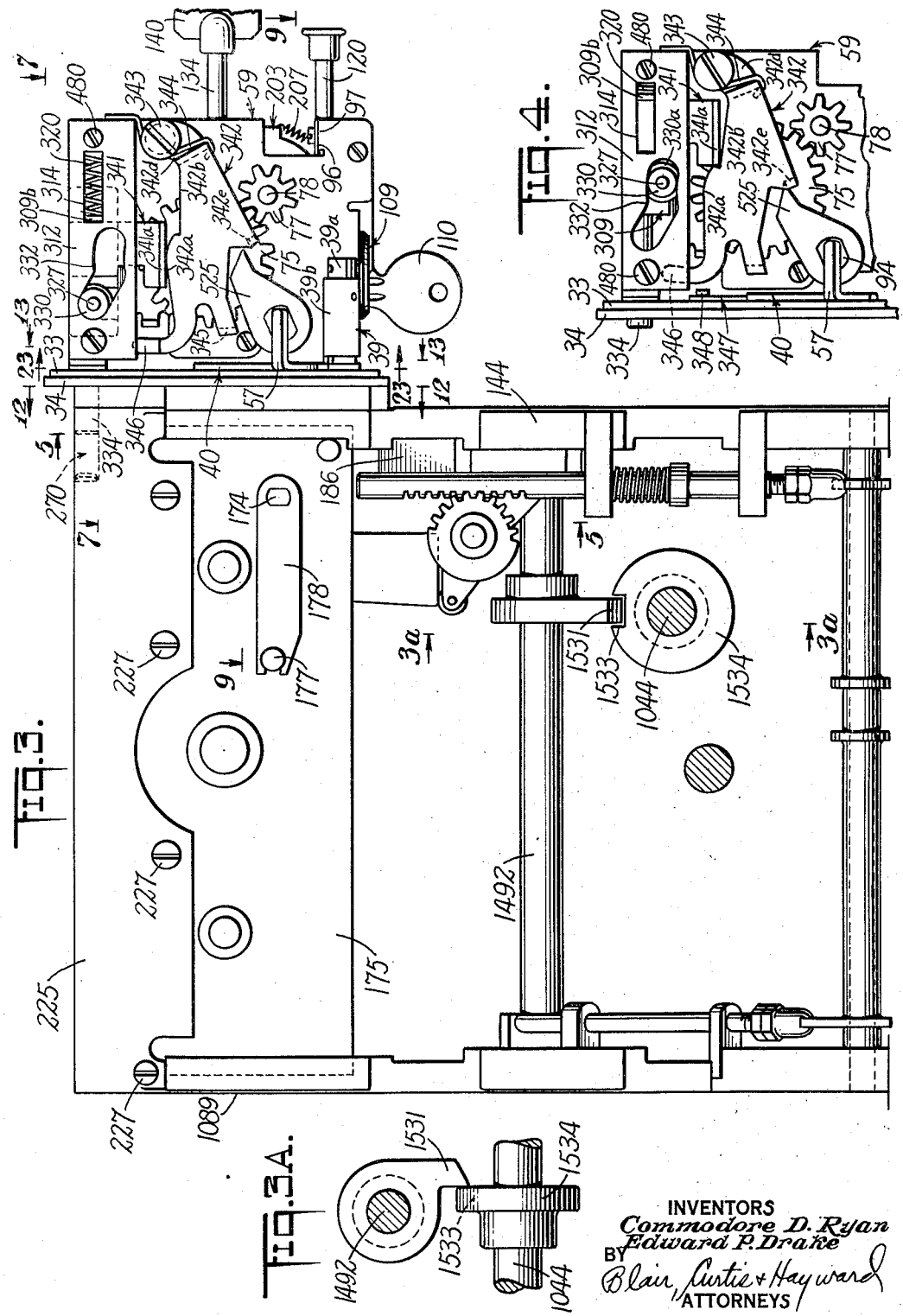

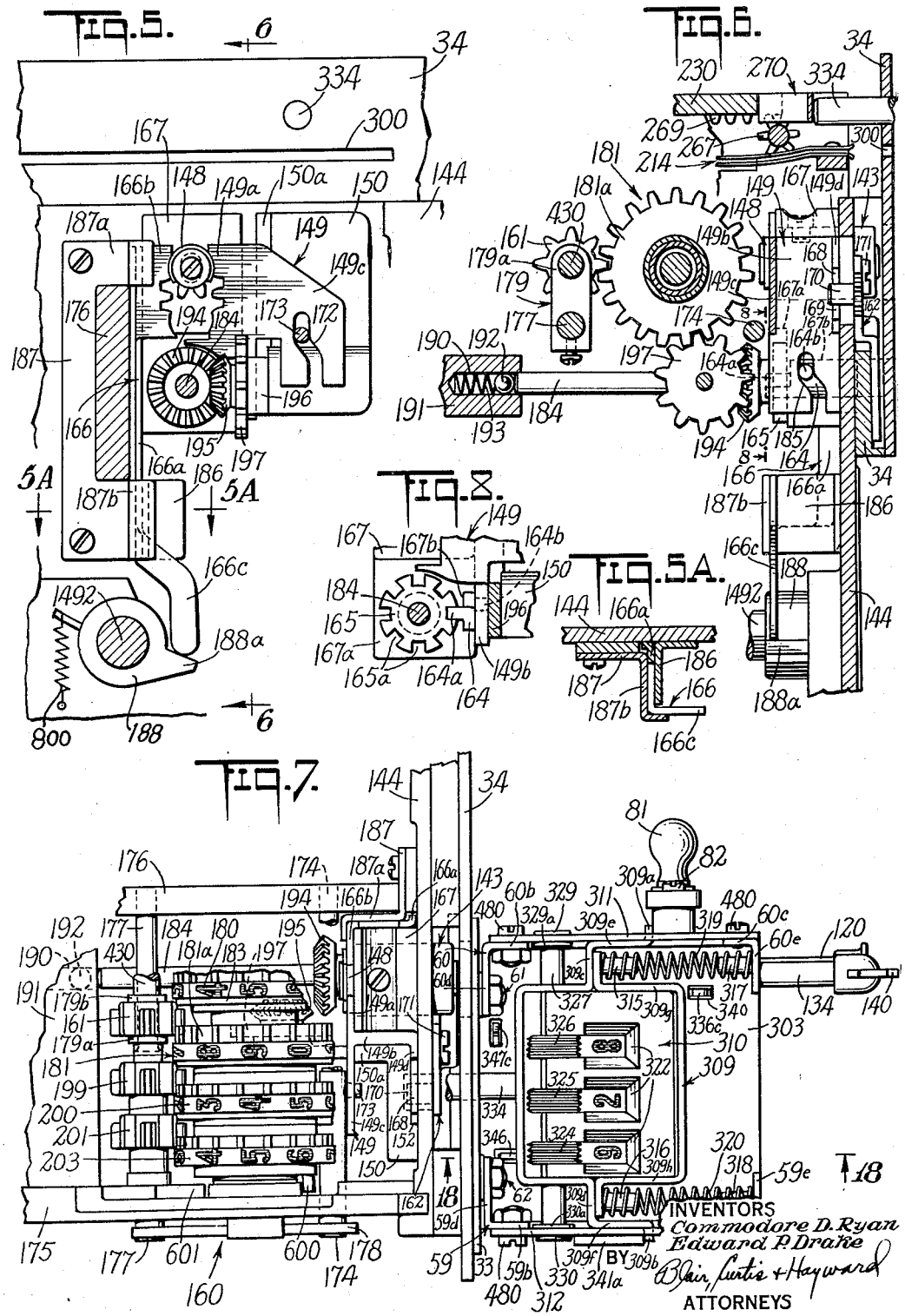

Sept. 12, 1950  C. D. RYAN ET AL  2,521,749
POSTAGE METER LOADING MECHANISM
Filed June 16, 1944  12 Sheets-Sheet 4
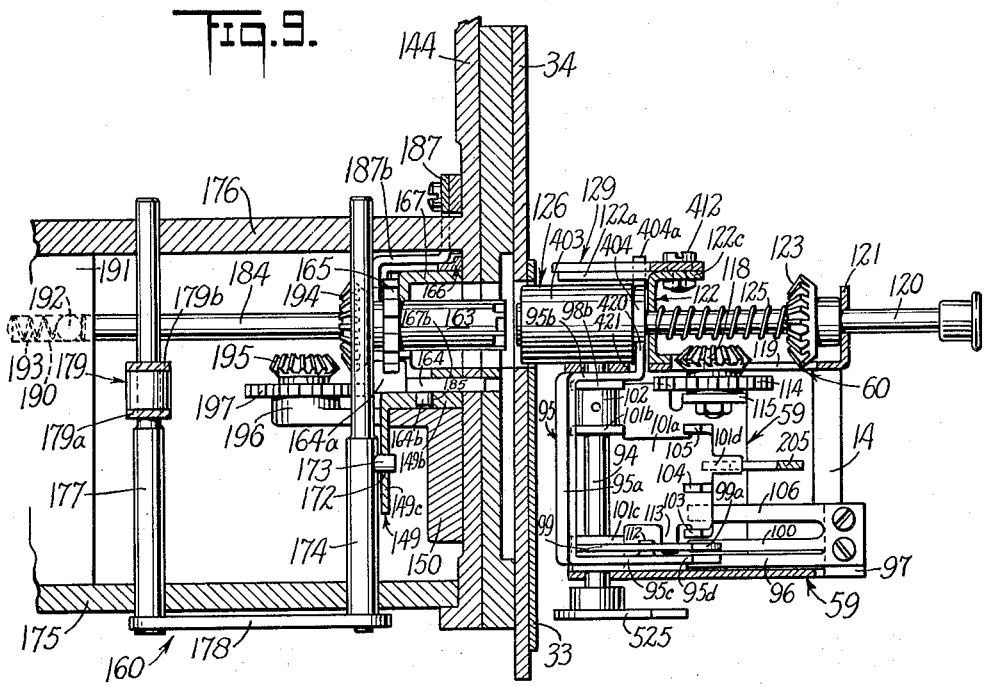
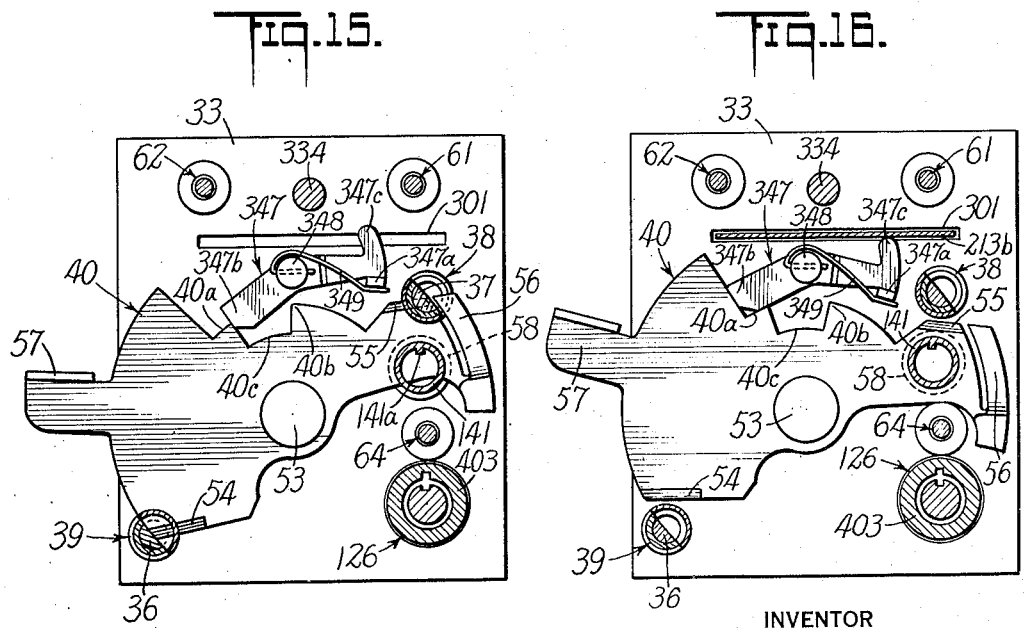
INVENTOR
Commodore D. Ryan
Edward P. Drake
BY
Blair, Curtis & Hayward
ATTORNEYS

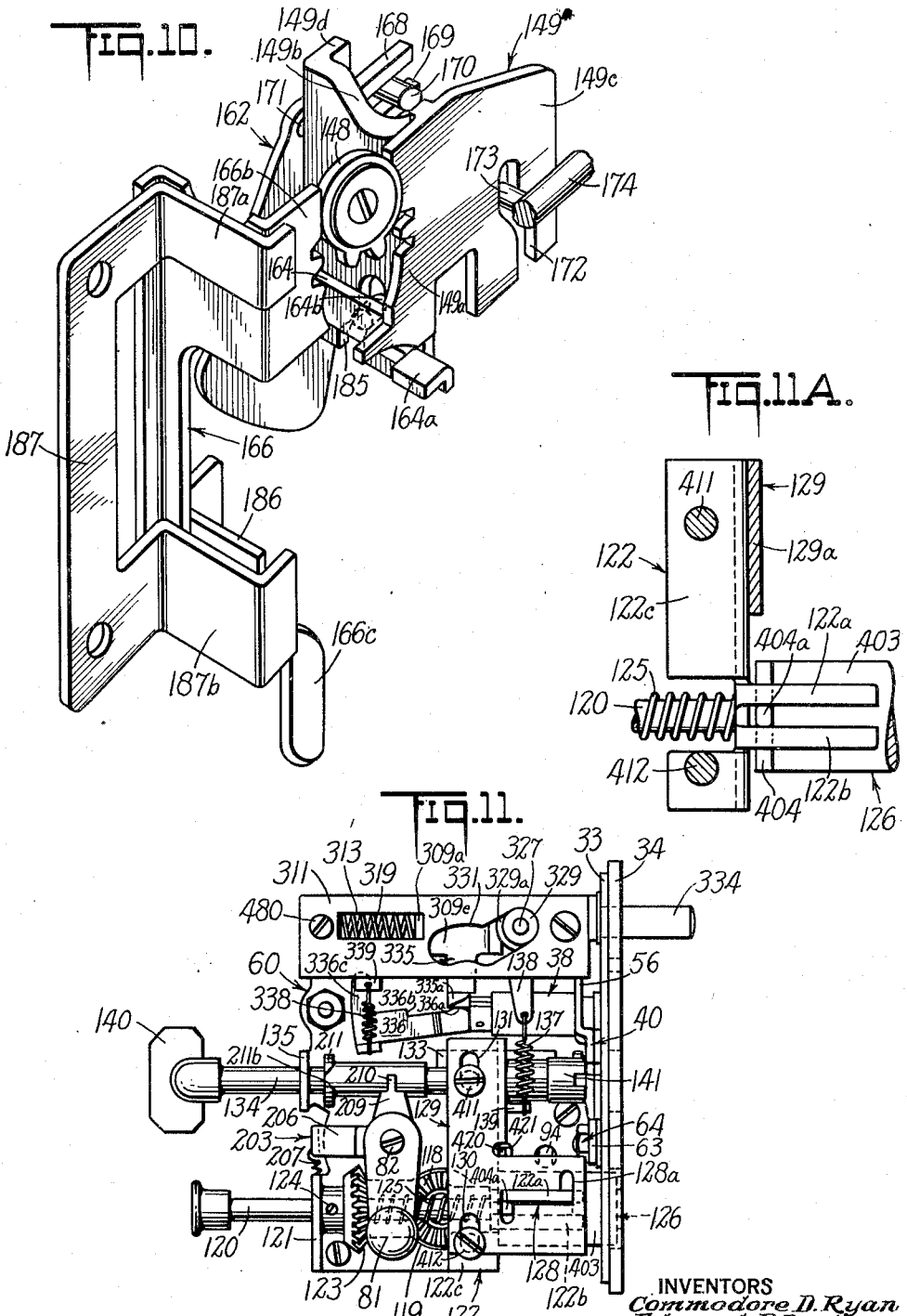

INVENTORS
*Commodore D. Ryan*
*Edward P. Drake*
BY *Blair, Curtis & Hayward*
ATTORNEYS

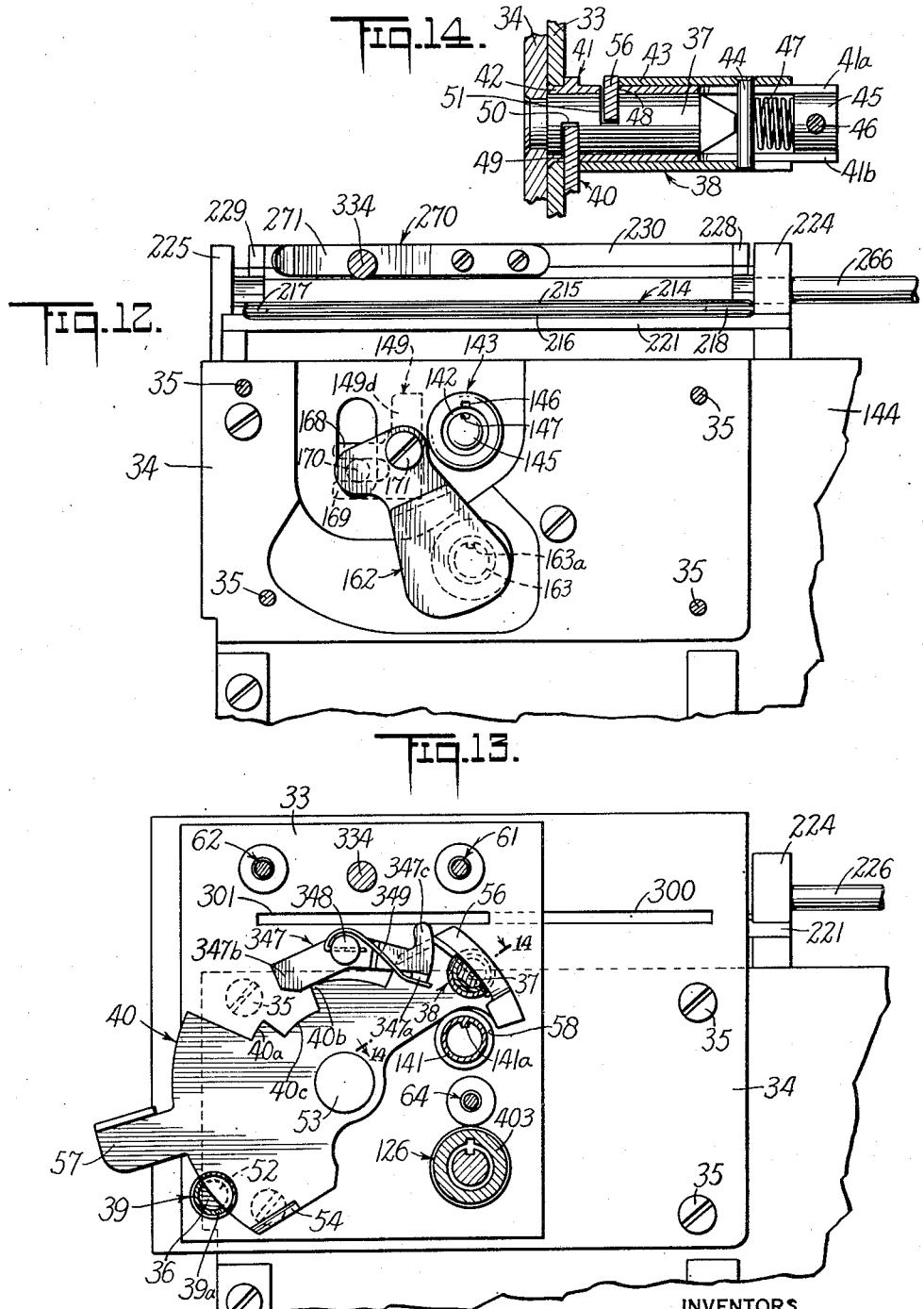

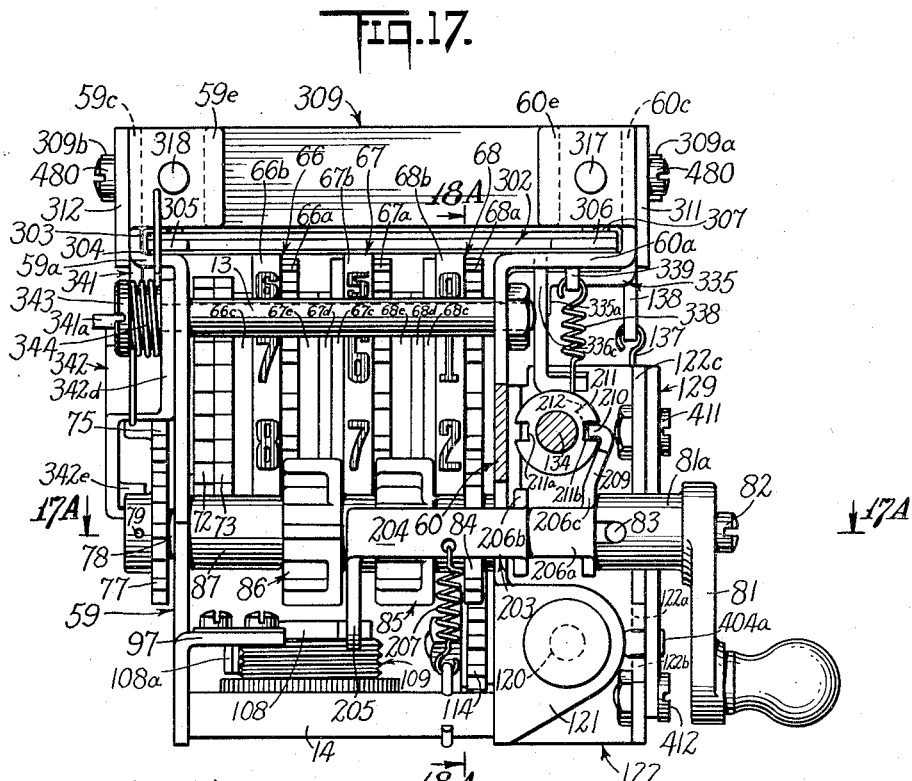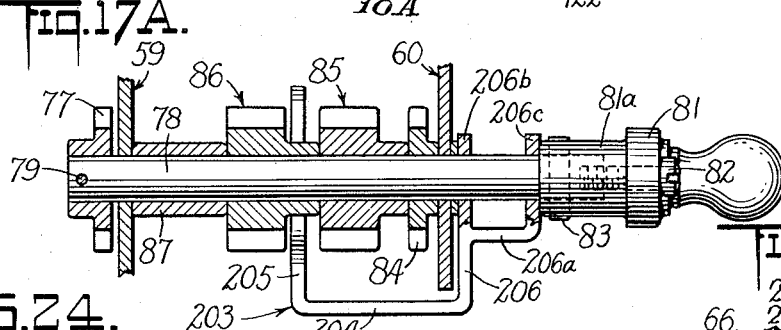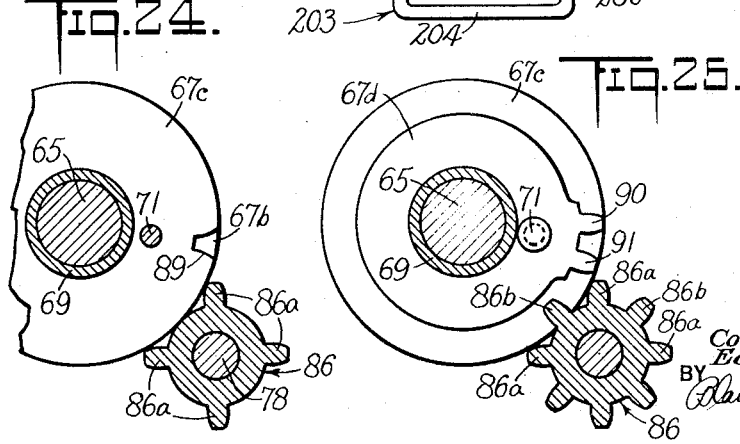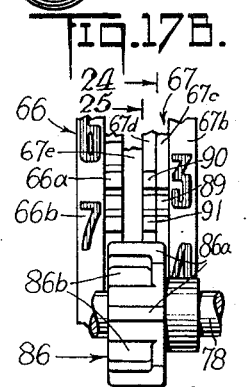

Sept. 12, 1950 C. D. RYAN ET AL 2,521,749
POSTAGE METER LOADING MECHANISM
Filed June 16, 1944 12 Sheets-Sheet 9

INVENTORS
Commodore D. Ryan
Edward P. Drake
BY Blair, Curtis & Hayward
ATTORNEYS

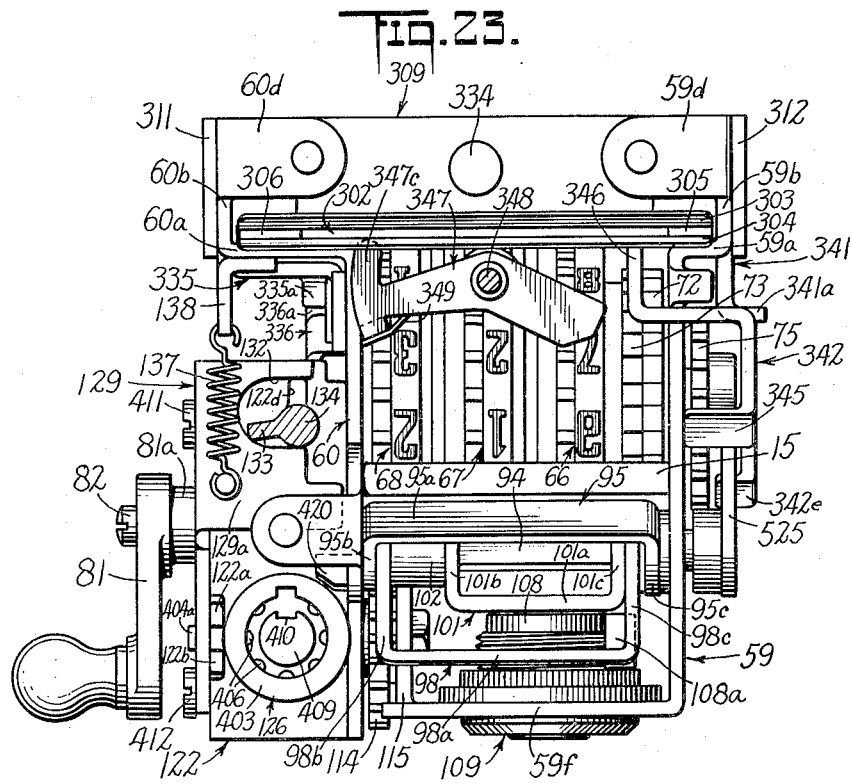
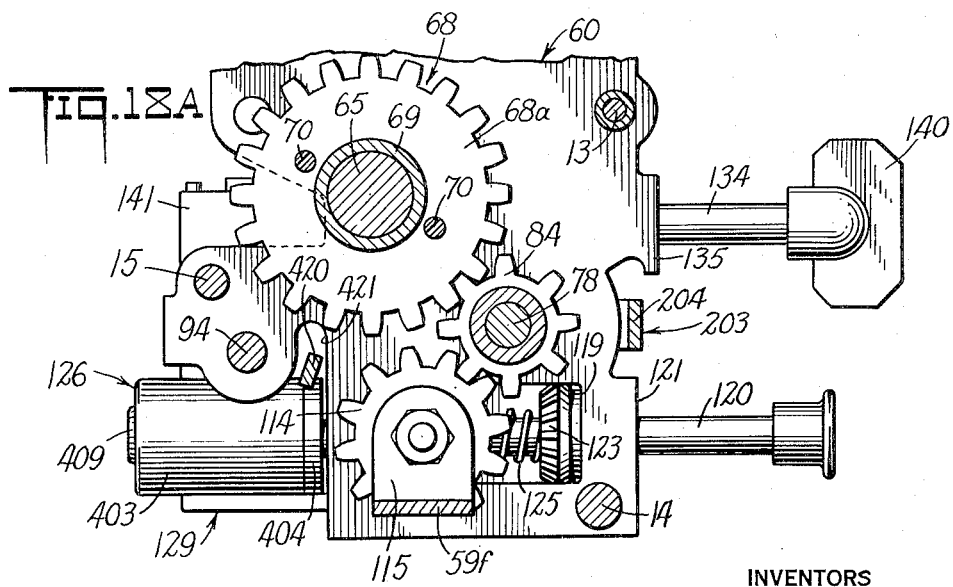

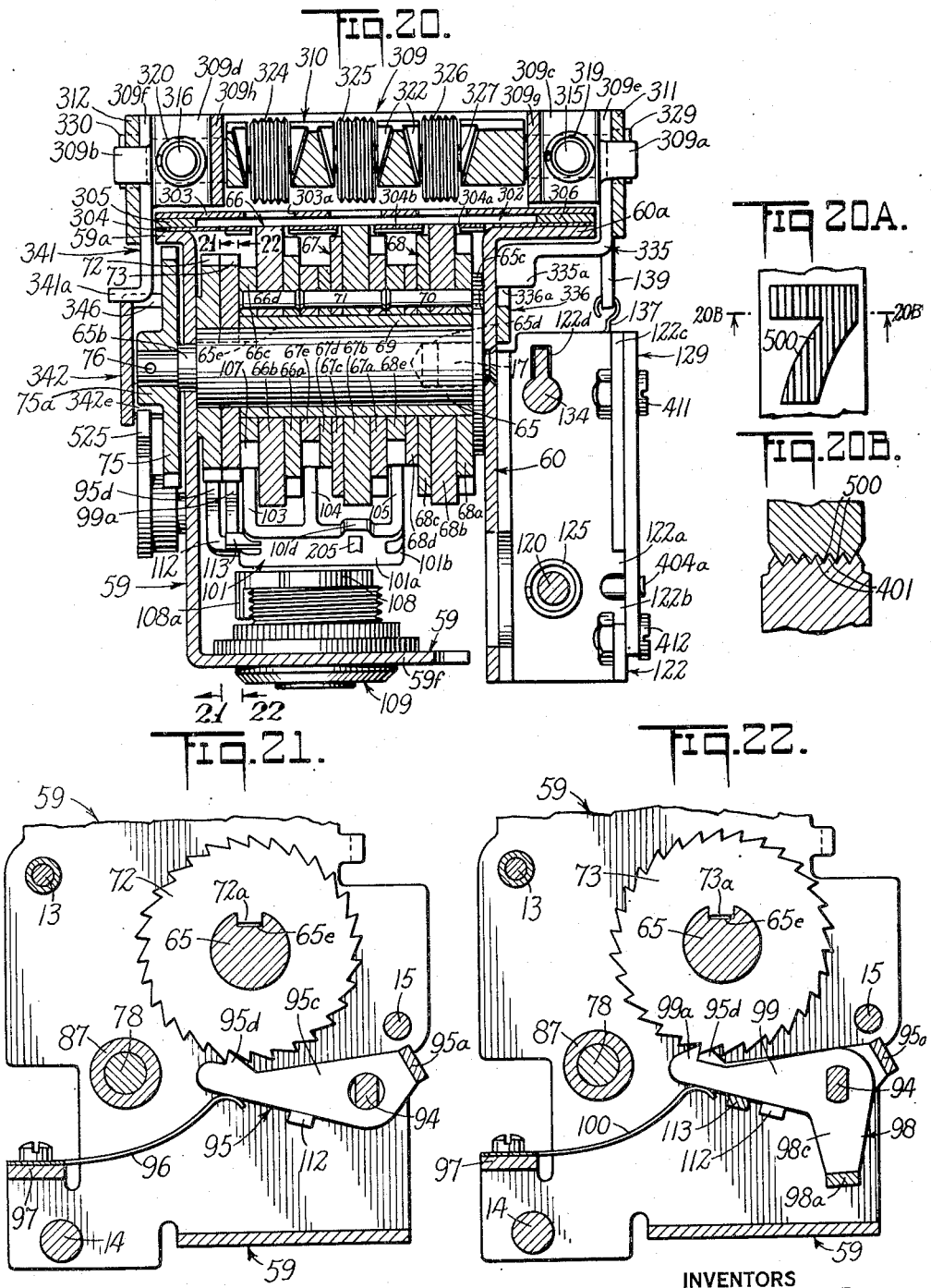

Sept. 12, 1950  C. D. RYAN ET AL  2,521,749
POSTAGE METER LOADING MECHANISM
Filed June 16, 1944  12 Sheets-Sheet 12
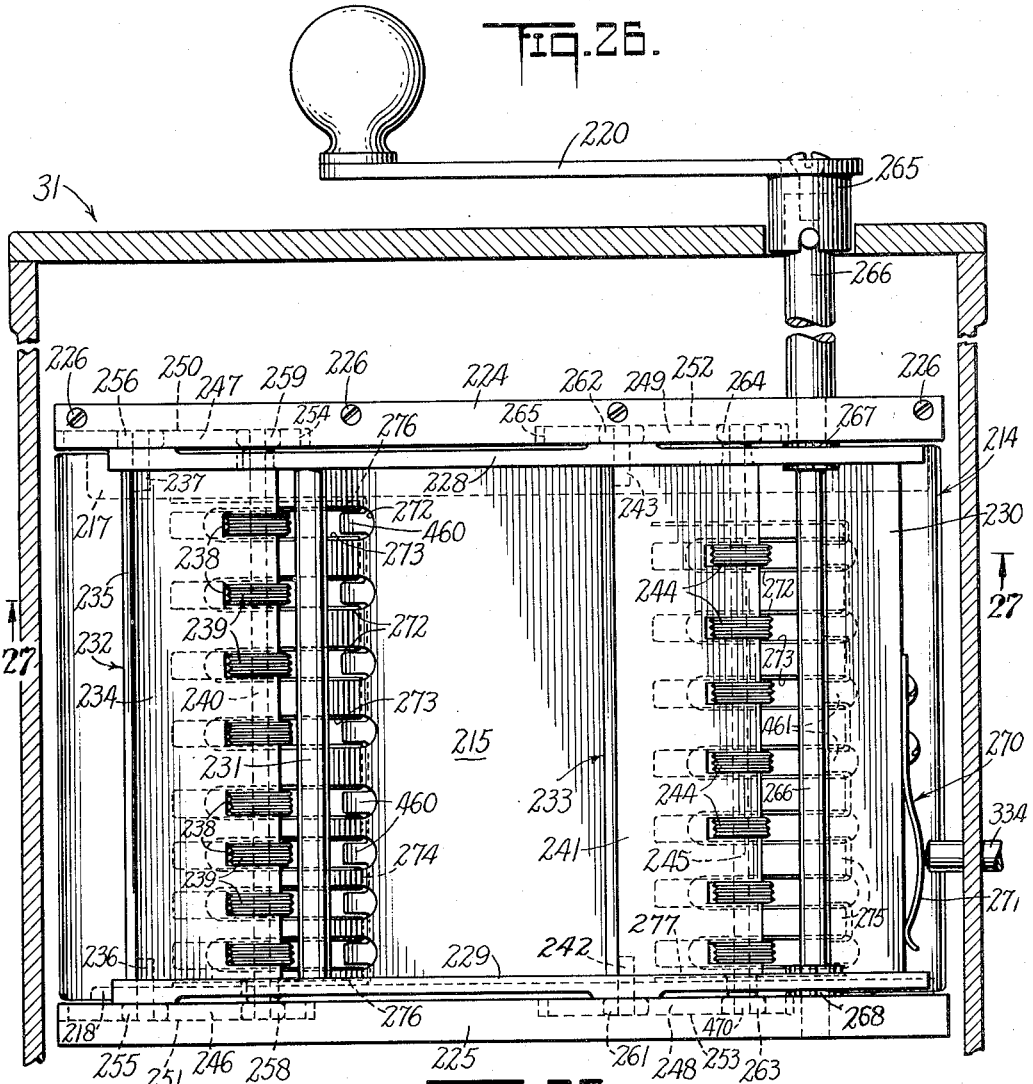
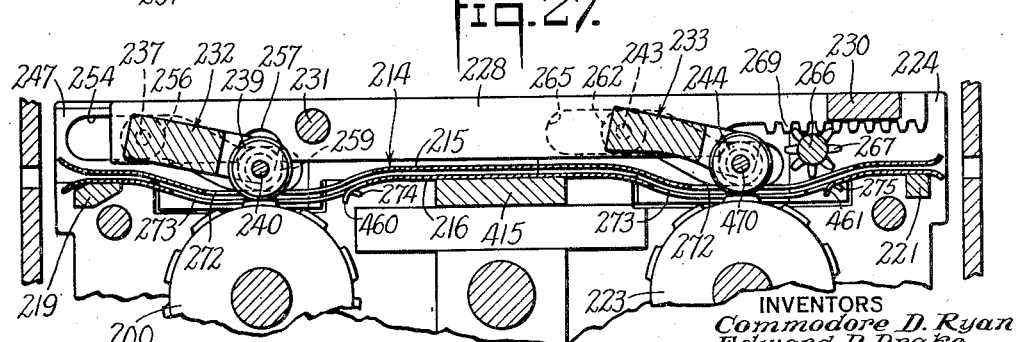
INVENTORS
*Commodore D. Ryan*
*Edward P. Drake*
BY *Blair, Curtis & Hayward*
ATTORNEYS Patented Sept. 12, 1950

2,521,749

UNITED STATES PATENT OFFICE 2,521,749

POSTAGE METER LOADING MECHANISM

Commodore D. Ryan and Edward P. Drake, Los Angeles, Calif., assignors to Commercial Controls Corporation, a corporation of Delaware Application June 16, 1944, Serial No. 540,727

27 Claims. (Cl. 235—101)

This invention relates to a loading device for the meter of a metered mailing machine.

One of the objects of this invention is to provide a simple, practical, and thoroughly durable loading device. Another object is to provide a device of the above character which may be economically manufactured. Another object is to provide a device of the above character which may be readily loaded by the post office and then the load therein readily transferred by the user to the register of a meter. Another object is to provide a device of the above character including efficient and practical devices to prevent unlawful tampering therewith. Another object is to provide a device of the above character which will be light in weight and thus readily carried to and from a post office. Another object is to provide a device of the above character which may be operated to produce a permanent record of the amount loaded into the meter. Other objects will be in part obvious and in part pointed out hereinafter.

This invention accordingly consists in the features of construction, combinations of elements, and arrangements of parts, as will be exemplified in the structure to be hereinafter described, and the scope of the application of which will be indicated in the following claims.

In the accompanying drawings in which is shown one of the various possible embodiments of this invention, Figure 1 is a perspective view of a meter having the loading device mounted thereon;

Figure 2 is a perspective view of the loading device;

Figure 3 is a rear elevation of the meter and loading device, the meter having certain parts removed for purposes of clarification and the loading device having its outer casing removed;

Figure 3A is a vertical section taken on the line 3a—3a of Figure 3;

Figure 4 is a rear elevation of certain portions of the loading device;

Figure 5 is a staggered vertical section taken on the line 5—5 of Figure 3;

Figure 5A is a horizontal section taken on the line 5A—5A of Figure 5;

Figure 6 is a vertical section taken on the line 6—6 of Figure 5;

Figure 7 is a staggered plan view of the loading device and the portion of the meter operated by the loading device taken on the line 7—7 of Figure 3, certain parts having been removed for purposes of clarification;

Figure 8 is a vertical section taken on the line 8—8 of Figure 6;

Figure 9 is a staggered horizontal section of a portion of the meter and the loading device taken on the line 9—9 of Figure 3;

Figure 10 is a perspective view of certain parts on the meter operated by the loading device;

Figures 11B, 11C, 11D, and 11E are front elevations of the lower portion of the loading device showing certain parts in different relative positions.

Figure 18:
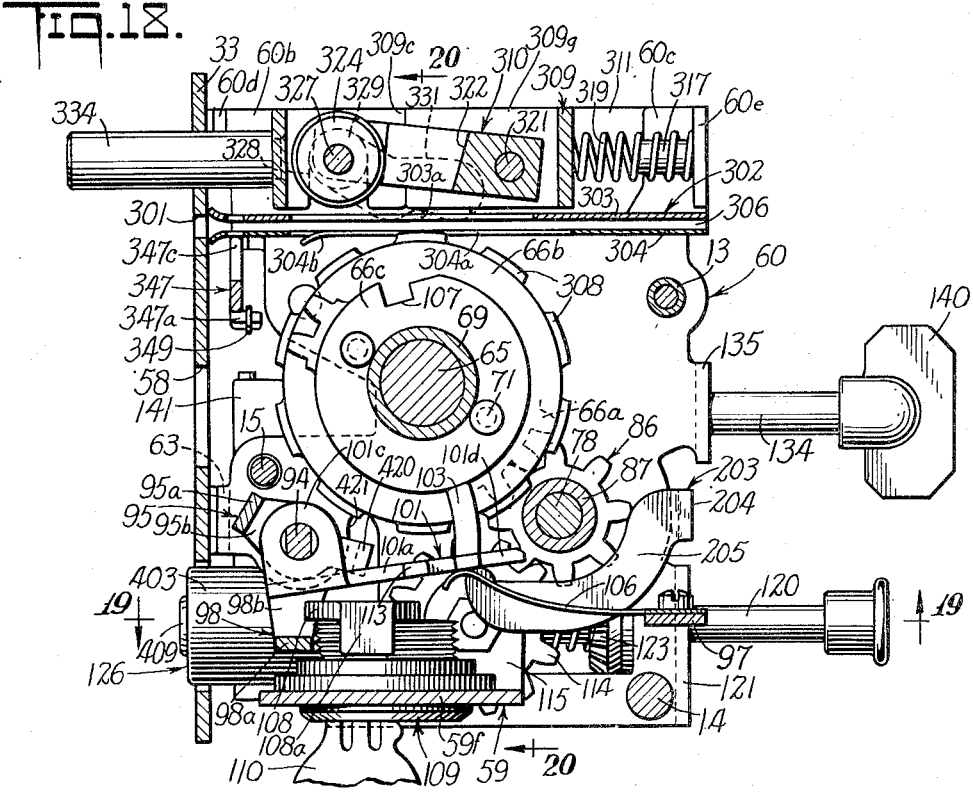

Figure 12 is a vertical section taken on the line 12—12 of Figure 3;

Figure 13 is a vertical section taken on the line 13—13 of Figure 3;

Figure 14 is a section taken through one of the positioning pins on line 14—14 of Figure 13;

Figures 15 and 16 are vertical sections of the loading device, similar to Figure 13, certain parts being shown in different relative positions in each figure;

Figure 17 is a side elevation of the loading device taken from the right of the loading device as viewed in Figure 3;

Figure 17A is a horizontal section of the transfer shaft of the loading device taken on the line 17A—17A of Figure 17;

Figure 17B is a view of a portion of Figure 17, the parts being in different relative positions;

Figure 18 is a vertical section of the loading device taken on the line 18—18 of Figure 7;

Figure 18A is a vertical section taken on the line 18A—18A of Figure 17.

Figure 19:
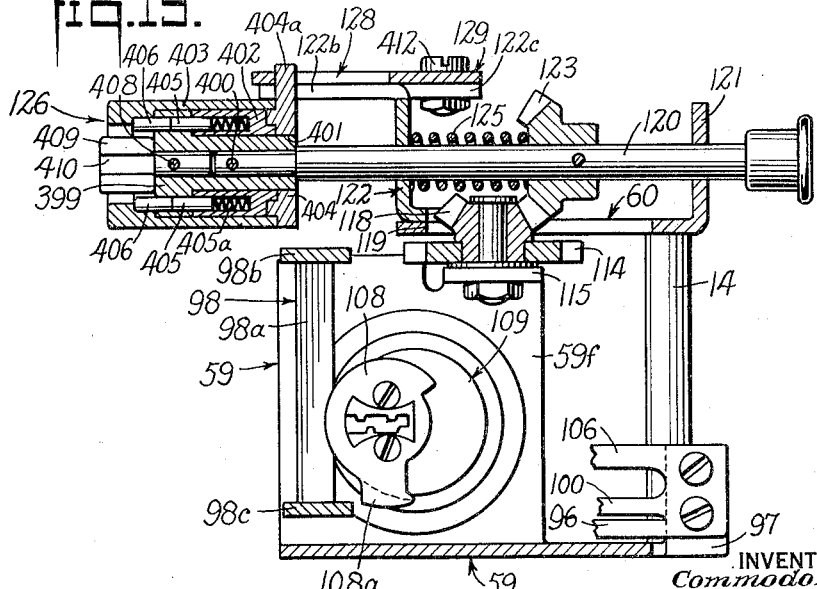

Figure 19 is a horizontal section taken on the line 19—19 of Figure 18;

Figure 20 is a staggered vertical section of the loading device taken on the line 20—20 of Figure 18;

Figure 20A is a plan view of one of the raised digits on a counter wheel;

Figure 20B is a section taken through an impression wheel and the raised digit shown in Figure 20A along the line 20B—20B;

Figure 21 is a vertical section of a portion of the loading device taken on the line 21—21 of Figure 20;

Figure 22 is a vertical section of certain portions of the loading device taken on the line 22—22 of Figure 20;

Figure 23 is a vertical section of the loading device taken on the line 23—23 of Figure 3;

Figure 24 is a vertical section taken on the line 24—24 of Figure 17B;

Figure 25 is a vertical section taken on the line 25—25 of Figure 17B;

Figure 26 is a top plan view of the meter showing the printing apparatus in printing position, certain portions of the meter being removed for purposes of clarification; and, Figure 27 is a vertical section taken on the line 27—27 of Figure 26.

Similar reference characters refer to similar parts throughout the several views of the drawings.

In general, the loading device consists of mechanism detachably mounted on the meter of a metered mailing machine. The meter is of a type controlled by a register which automatically locks the meter when the supply of postage set on the register is exhausted. The register controls the operation of the meter through any of the zero locks now in use on this type of meter. As a rule the register is of the descending type and each of the higher counter wheels are provided with notches into which feeler fingers move when all of the notched counter wheels are in zero position. The feeler fingers are connected by suitable mechanism to the main drive shaft of the meter, so that when the feeler fingers move into the notches in the counter wheels the mechanism locks the meter against further operation. This mechanism is not shown as it may be found in any of the meter patents in this art and any type of zero lock may be used in conjunction with the mechanism to be described hereinafter. Mechanism of this type is shown in U. S. Letters Patent No. 2,371,070. In use, the loading device is taken to a post office where it is set or "loaded" with the amount of postage purchased. The loading device is then mounted on the meter and the loaded amount is transferred from the loading device to the register of the meter. After the meter is loaded, it is unlocked by mechanism on the loading device, and then the meter may be operated. Whenever the loading device is detached from the meter, the meter is locked against operation. Thus, each time the loading device is used, the available amount of postage in the meter is increased by the amount purchased by the user for the loading device. Accordingly, the loading device permits the user to increase the supply of postage in his meter at will without taking the meter to the post office.

It might here be noted that reference hereinafter to a "forward" direction signifies a direction toward the printing head 10 (Figure 1) from the meter handle support 11, while the term "rearward" denotes a direction opposite thereto. An "inward" direction refers to a direction from the loading device 30 in Figure 1 transversely across the meter 31, whereas the term "outward" denotes the opposite direction. An "upward" direction refers to a direction upwardly from the bottom of the meter to its top, while a "downward" direction is opposite thereto. When the above terms are referred to hereinafter in describing the loading device, the terms will be applied as through the loading device were mounted on the meter as shown in Figure 1.

Referring now to the drawings in detail, the loading device, generally indicated at 30 (Figure 1), is mounted on a meter, generally indicated at 31, similar to that shown and described in Patent No. 2,371,070, for Mail Treating Machine. The housing 32 of the loader (Figures 1 and 2) includes a top, bottom, and three side walls, and fits over the loading device so that the edge of the open side thereof fits the edge of a face plate 33. The housing 32 is secured to the face plate 33 by screws (not shown) which are sealed to prevent removal of the housing and thus tampering with the loading device. The loading device is detachably mounted in the upper rear left-hand corner of the meter, as viewed in Figure 1, with its face plate 33 (Figure 2) facing the side wall of the meter. A supporting plate 34 (Figures 3 and 13) is secured to the framework of the meter by screws 35 and carries a pair of positioning pins 36 and 37 diagonally positioned thereon. These pins extend outwardly from the meter at right angles to plate 34.

Positioning pins 36 and 37 enter socket assemblies, generally indicated at 38 and 39 (Figures 3, 11, 13, and 14), which are mounted on and extend outwardly from face plate 33. These socket assemblies are substantially similar in construction, each being actuated by its respective positioning pin as the loading device is mounted to condition the socket assemblies so that a locking plate, generally indicated at 40 (Figure 16), can be rotated in a counterclockwise direction to lock the loading device to the positioning pins (Figure 13) and thus to the meter. Referring to Figure 14, in which the action of positioning pin 37 on socket assembly 38 is shown, the socket assembly includes an inner shell, generally indicated at 41, the left end of which, as viewed in this figure, is secured in a hole 42 in face plate 33. The inner diameter of shell 41 is slightly greater than the diameter of positioning pin 37. A tubular sleeve 43, which is slidably mounted on shell 41 for longitudinal movement with respect thereto, has a pin 44 extending between and secured to its side walls. This pin moves in longitudinal slots 41a and 41b extending inwardly from the outer end of shell 41.

A plug 45 (Figure 14), positioned in the outer end of shell 41, is secured to shell 41 by a pin 46. A spring 47, acting between plug 45 and pin 44, resiliently urges pin 44 and thus sleeve 43 inwardly toward the meter. Movement in this direction is limited by sleeve 43 abutting against face plate 33. When positioning pin 37 enters the socket assembly 38, its outer end strikes pin 44 and thus moves sleeve 43 outwardly against the compression spring 47. When pin 37 is seated in shell 41, sleeve 43 has been moved outwardly a sufficient distance to uncover slots 48 and 49 cut in shell 41. These slots register with slots 50 and 51 in positioning pin 37.

The construction of socket assembly 39 (Figures 3 and 13) and pin 36 is substantially similar to socket assembly 38 with the exception that there is only a single slot in the inner shell of socket assembly 39 and a single slot 52 (Figure 13) in positioning pin 36. The slot in shell 39a is positioned adjacent face plate 33 (Figure 3) and registers with slot 52 when the socket assembly is conditioned by positioning pin 36.

When the loading device is mounted on pins 36 and 37, socket assemblies 38 and 39 are conditioned to coact with locking plate 40 to lock the loading device to the meter. The body of plate 40 is flat, is pivotally mounted on face plate 33 by a pivot pin 53, and is manually moved by finger piece 57 (Figures 2 and 16). Referring to Figure 15, as locking plate 40 is pivoted in a counterclockwise direction, the leading edges 54 and 55 on the outer portions of the plate pass into the slot 49 of socket assembly 38 and the corresponding slot in socket assembly 39 and the slots in pins 36 and 37 in registry therewith. At the same time, an arm 56 (Figures 11 and 16), which extends outwardly from and then continues parallel to plate 40, passes through the outer slot 48 (Figure 14) in shell 41 and the outer slot 51 in pin 37. Thus, when the loading device is mounted on the positioning pins, the positioning pins condition the socket assemblies to open slots therein and expose slots in the positioning pins. Then the locking plate 40 is turned in a counterclockwise direction and portions of the locking plate and arm thereon pass through the slots in the socket assembly shells and positioning pins, thus securely locking the loading device to the meter.

Locking plate 40, in addition to its locking function, acts as a shutter to cover a hole 58 (Figures 2 and 16) in face plate 33 when the plate 40 is in its unlocked position (Figure 16). When the plate 40 is moved to a position in which it locks the loading device to pins 36 and 37 (Figure 13), hole 58 is uncovered. As will be fully described hereinafter, a key shaft moves inwardly through hole 58 into the meter during conditioning of the meter before a load can be transferred from the loading device. Thus the operation of the key shaft is contingent upon moving the locking plate 40 to a locked position where it does not block hole 58.

The mechanism of the loading device is mounted on two side walls, generally indicated at 59 and 60 (Figures 17, 18 and 20), which are connected by spacing rods 13, 14, and 15 (Figures 17, 18, and 23). The main portion of side wall 60 (Figure 17) is positioned in a vertical plane at right angles to face plate 33 (Figure 18). The upper portion of side wall 60 (Figure 17) has a forwardly extending portion 60a, and then the side wall extends upwardly adjacent the inner and outer ends of portion 60a (Figure 7) to form ears 60b and 60c. Ear 60b has a portion 60d which extends rearwardly at right angles to ear 60b, and this portion of the side wall is secured to face plate 33 by a nut and stud bolt, generally indicated at 61.

The main portion of side wall 59 (Figure 17) is parallel to side wall 60 and its upper portion 59a extends rearwardly. A pair of ears 59b and 59c (Figures 7 and 17) extend upwardly from the rearwardly extending portion 59a. Ear 59c (Figure 7) has a portion 59d extending forwardly at right angles to ear 59c which is connected to face plate 33 by a nut and stud bolt, generally indicated at 62. As is best shown in Figures 11 and 18, another ear 63 is formed on side wall 60 extending at right angles thereto from the inner edge thereof. This ear is connected to face plate 33 by a nut and stud bolt, generally indicated at 64 (Figure 11). Thus side wall 60 is connected to face plate 33 at two points; side wall 59 is connected to face plate 33 at one point, and the upper portions of the side walls extend forwardly and rearwardly and then both extend upwardly to form a seat for printing apparatus to be described hereinafter.

A counter wheel shaft 65 (Figures 18 and 20) extends between side walls 59 and 60 and its rear end has a reduced portion 65b journaled in side wall 59. The other end of the shaft is mounted on a pin 17 secured to side wall 60 which extends into a bore 65d in the end of shaft 65. A sleeve 69 freely mounted on shaft 65 has a series of counter wheels 66, 67, and 68 mounted thereon. Counter wheel 68 includes a gear 68a, a counter wheel disc 68b, a Geneva sliding disc 68c, a Geneva carry-over disc 68d, and a locking disc 68e. An annular flange 65c extends outwardly in a radial plane from shaft 65 adjacent side wall 60 (Figure 20) and this flange, gear 68a, counter wheel disc 68b, Geneva sliding disc 68c, carry-over disc 68d, and locking disc 68e are riveted together by a series of rivets, one of which is shown at 70. Thus counter wheel assembly 68 is connected through flange 65c to shaft 65.

Counter wheel assembly 67 includes a transfer gear 67a, counter wheel disc 67b, Geneva sliding disc 67c, a Geneva carry-over disc 67d, and locking disc 67e which are connected together to form a unit by rivets, such as rivet 71. Counter wheel 67 is freely mounted on sleeve 69 permitting rotational movement of this counter wheel with respect to shaft 65. Counter wheel 66 includes a gear 66a, a counter wheel disc 66b, and a locking disc 66c. The discs of this assembly are also secured together by a rivet 66d and this counter wheel is also freely mounted on sleeve 69 to permit rotational movement of the counter wheel with respect to shaft 65. A pair of ratchet wheels 72 and 73 are mounted on shaft 65 between counter wheel 66 and side wall 59 (Figures 20, 21, and 22). These wheels have keys 72a and 73a formed thereon which fit into a keyway 65e in shaft 65.

A spur gear 75 (Figure 20) having its hub 75a secured to an extension of shaft 65 by a tapered pin 76, meshes with a gear 77 (Figures 3, 17, and 17A) secured to the rear end of a transfer pinion shaft 78 by a tapered pin 79. Transfer pinion shaft 78 is journaled in side walls 59 and 60 (Figure 17A) and has three pinions 84, 85, and 86, and a sleeve 87 rotatably mounted thereon. Shaft 78 is manually turned by a handle 81 (Figures 11, 17, and 17A) secured to its forward end. The hub 81a of the handle has lots therein to accommodate a pin 83 extending through shaft 78. A screw 82 passing through the hub of handle 81 and threading into the end of shaft 78 mounts the handle on the forward end of shaft 78 in engagement with pin 83. Thus as handle 81 is turned, shaft 78 (Figures 3 and 17) drives spur gear 75 through gear 77. As spur gear 75 (Figure 20) is connected to shaft 65, counter wheel 68 and ratchet wheels 72 and 73 turn with gear 75. Thus turning handle 81 drives counter wheel 68 and ratchet wheels 72 and 73.

As described hereinabove, counter wheel 68 (Figure 17) is driven by handle 81 through shaft 78, gear 77, gear 75, shaft 65, and flange 65c (Figure 20). Each time counter wheel 68 (Figure 17) makes a complete revolution, the Geneva carry-over disc 68d thereof acts through transfer pinion 85 to move counter wheel 67 one digit. Each time counter wheel 67 makes a complete revolution, its Geneva carry-over disc 67d acts through transfer pinion 86 to move counter wheel 66 one digit. As the transfer from counter wheel 68 to counter wheel 67 by transfer pinion 85 and from counter wheel 67 to counterwheel 66 by transfer pinion 86 is substantially the same, detailed description will be limited to the transfer of digits from transfer assembly 67 to transfer assembly 66.

Transfer pinion 86 (Figures 17 and 17B) has eight teeth (Figure 25). Alternate teeth (Figures 17B and 24) of this transfer pinion are cut back so as to clear the edge of Geneva sliding disc 67c. The carry-over disc 67d (Figure 25) is of a smaller diameter than disc 67c and the right-hand edges of cut back teeth 86a, as viewed in Figure 17B, extend over carry-over disc 67d. The Geneva drive includes a notch 89 (Figures 17B and 24) cut in the sliding disc 67c and a pair of teeth 90 and 91 (Figures 17B and 25) which are in registry with notch 89. As discs 67c and 67d turn, two full-length teeth 86a (Figure 24) slide on disc 67c. This locks transfer pinion 86 against rotation. At the end of a revolution, tooth 91 on disc 67d strikes one of the cut-back teeth 86b (Figure 25). Pinion 86 is then turned one quarter of a turn because the full-length tooth 86a positioned clockwise from the cut-back tooth 86b engaged by tooth 91 enters notch 89 in disc 67c.

Gear 66a of counter wheel 66 has twenty teeth and these teeth mesh with the teeth of pinion 86. Thus as the pinion 86 turns one-quarter of a turn or two teeth, gear 66a is moved a distance of two teeth or one digit. As described hereinabove, when the full-length teeth 86a of transfer pinion 86 are sliding on the sliding edge of sliding disc 67c, transfer pinion 86 is locked against rotation. Thus because gear 66a of counterwheel 66 is in engagement with the transfer pinion 86, counter wheel 66 is locked against rotation until a transfer takes place. Transfer pinion 85 (Figure 17) acts in a similar way to move counter wheel 67 the distance of one digit each time counter wheel 68 makes a single revolution. Thus, each time counter wheel 68 makes a revolution, counter wheel 67 is moved one digit, and each time counter wheel 67 makes a revolution, counter wheel 66 is moved one digit, as indicated by the numbers on the counter wheels.

Referring to Figures 9, 18, and 23, a pawl shaft 94 extends transversely across the loading device and is journaled in side walls 59 and 60. A U-shaped bracket, generally indicated at 95, including a center portion 95a and a pair of legs 95b and 95c (Figures 9 and 18) is pivotally mounted on shaft 94, which passes through legs 95b and 95c. As is best shown in Figure 21, leg 95c extends outwardly into the loading device beneath ratchet wheel 72 and has a pawl 95d formed thereon. Pawl 95d is resiliently urged into contact with ratchet wheel 72 by a leaf spring 96 having its outer end mounted on an ear 97 (Figures 9 and 17) extending forwardly from side wall 59.

A second U-shaped bracket, generally indicated at 98 (Figures 18 and 23), including a center portion 98a and a pair of legs 98b and 98c, is mounted on and keyed to shaft 94 by its legs 98b and 98c. Leg 98c (Figure 22) which is normally vertically positioned in the loading device has a portion 99 extending outwardly in the loading device. This portion has a locking pawl 99a formed thereon positioned beneath ratchet wheel 73. Pawl 99a is resiliently held in contact with ratchet wheel 73 by a leaf spring 100, the outer end of which is also mounted on ear 97.

A third U-shaped bracket, generally indicated at 101, (Figures 9 and 23) acts as zero lock to prevent further operation of the loading device when the counter wheels reach zero position. This bracket includes a center portion 101a, leg portions 101b and 101c, pivotally mounted on shaft 94 which extends through its leg portions 101b and 101c. Leg 101b of bracket 101 is spaced from leg 98b of bracket 98 by a sleeve 102 (Figure 23). The center portion 101a of this bracket (Figures 9, 18, and 20) extends outwardly into the loading device beneath counter wheels 66, 67, and 68. Three locking fingers 103, 104, and 105 extend upwardly from the outer end of portion 101a of bracket 101 and are resiliently held in engagement with the peripheries of locking discs 66c, 67e, and 68e, respectively, by a leaf spring 106 (Figures 9 and 18), the outer end of which is also secured to ear 97.

Each locking disc has a notch therein, such as notch 107 (Figure 18) in the locking disc 66c. When all of the notches in the locking discs of the counter wheels are positioned in alignment with the upper ends of fingers 103, 104, and 105, as is shown in Figure 20, then spring 106 acts through bracket 101 to move the upper ends of fingers 103, 104, and 105 into the notches in their respective locking discs. The notches in the locking discs reach this position when the zero digits are all at the top of the counter wheels. When the loading device is being unloaded, the sum on the register of the loading device is descending. Thus, when zero position is reached, the notch in locking disc 68a registers with finger 105 and further operation of the device is automatically prevented because of the direct drive between handle 81 and counter wheel 68. Before locking takes place, fingers 103, 104, and 105 do not interfere with the operation of the device because as long as one finger is riding on the periphery of its locking disc, the zero lock cannot become effective.

Pawl 95d (Figure 21) coacts with ratchet wheel 72 to prevent counterclockwise rotation of shaft 65. This is the direction in which shaft 65 turns during unloading of the loading device or the transfer of the load therein to the meter register. This pawl prevents unloading of the loading device when the loading device has not been mounted on the meter and conditioned for unloading. As will be fully described hereinafter, this pawl is moved out of engagement with ratchet wheel 72 during the time the loading device is being conditioned for the transfer of the load to the meter.

As is best shown in Figure 20, side wall 59 has a portion extending forwardly to form a support 59f. This support carries the post office lock, generally indicated at 109 (Figures 18 and 20). When the key 110 of this lock is turned, it turns a plate 108 (Figure 19) secured to the upper end of the lock cylinder. Plate 108 is turned in a clockwise direction, as viewed in Figure 19, when the loading device is unlocked and this moves a downwardly extending arm 108a on plate 108 into contact with the center portion 98a of bracket 98. Arm 108a cams center portion 98a inwardly (Figure 19) or moves bracket 98 and shaft 94 in a counterclockwise direction, as viewed in Figure 22. Pawl 99a, which coacts with ratchet wheel 73 to prevent clockwise movement of shaft 65, is thus moved out of engagement with ratchet wheel 73. Thus when the loading device is unlocked at the post office, the loading device may be loaded by turning the counter wheels in a counterclockwise direction, as viewed in Figure 18. When away from the post office and locked, pawl 99a and ratchet 73 prevent fraudulent loading of the loading device by preventing movement of the counter wheels in this direction. However, because the counter wheels are turned in the opposite direction during unloading, the loading device register is free to descend and then lock when zero position is reached.

Leg 95c of bracket 95 (Figures 9 and 21) has a lug 112 formed thereon which extends forwardly beneath portion 99 (Figure 9) of bracket 98, and the center portion 101a of bracket 101 has a lug 113 which extends rearwardly beneath portion 99. Thus when portion 99 (Figure 22) is moved downwardly, as described hereinabove, it strikes lugs 112 and 113 carrying pawl 95d out of engagement with ratchet 72 (Figure 21) and the fingers 103, 104, and 105 (Figure 20) on portion 101a of bracket 101 out of the notches in the locking discs of the counter wheels. Thus, when the loading device is unlocked at the post office by turning the key in lock 109, the pawls 95d and 99a are disengaged and the counter wheels are freed so that the counter wheels may be turned in a counterclockwise direction, as viewed in Figure 18, to load the loading device. When the key is turned (Figure 19) to its locking position, pressure on the center portion 98a of bracket 98 is released and the leaf springs 96, 100, and 106 (Figures 9, 21, and 22) place pawls 95d and 99a and locking fingers 103, 104, and 105 in operative condition.

Gear 68a of counter wheel 68 (Figure 18A) meshes with transfer pinion 84 (Figures 17 and 17A) rotatably mounted on transfer pinion shaft 78. Pinion 84 (Figure 18A) meshes in turn with a gear 114 (Figures 9 and 18A) which is pivotally mounted on an ear 115 (Figures 18 and 23) extending upwardly from the forward edge of lock support 59f. Gear 114 (Figure 9) has a bevel pinion 118 secured thereto mounted on the same shaft as gear 114. Bevel pinion 118 extends through a hole 119 in side wall 60 and is positioned to permit its engagement with a pinion 123 mounted on a transfer shaft 120. Transfer shaft 120 (Figures 9, 11, 19, and 20) is mounted for rotational movement in holes in an ear 121 (Figures 9 and 19) extending forwardly from side wall 60 adjacent the bottom (Figure 17) thereof and in channel-shaped bracket 122 (Figures 19 and 20) vertically secured to side wall 60. Bevel pinion 123 is connected to shaft 120 by a set screw 124 (Figure 11). A spring 125 (Figures 9 and 19) extending between the outer surface of bracket 122 and the inner surface of bevel pinion 123 resiliently urges bevel pinion 123 and thus shaft 120 outwardly or to the right, as viewed in Figure 9.

The inner end of shaft 120 has a lock, generally indicated at 126 (Figure 19), connected thereto to prevent rotation of transfer shaft 120 until shaft 120 is keyed through the lock to the meter transfer mechanism. This lock includes a spindle 399 connected to the inner end of shaft 120 by a pin 400. The outer end of spindle 399 extends through a hole 401 in a base plate 404 and is free to rotate with respect thereto. Base plate 404 is connected to an annular ring 402 which in turn is connected to the cylindrical lock casing 403 by a pin (not shown). Base plate 404 has a lug 404a thereon (Figures, 11, 11A, and 19) which extends forwardly between a pair of fingers 122a and 122b (Figure 11A) formed on and extending inwardly from bracket 122 (Figure 19). As shaft 120 is moved inwardly and outwardly, lug 404a is always positioned in the slot between fingers 122a and 122b and thus casing 403, base plate 404, and ring 402 are locked against rotation.

Spindle 399 is locked against rotation by pins 405 which extend out of bores in ring 402 into bores in the enlarged portion of spindle 399. A cylindrically shaped key 163 (Figure 12) on the meter acts on a separate set of pins 406 (Figures 19 and 23) to move pins 405 outwardly against the action of springs 405a to positions where they no longer engage the enlarged portion of spindle 399. At this time spindle 399 is free to be driven by shaft 120 and the driving connection with the meter is established by a lug 163a (Figure 12) on cylindrically shaped key 163 which engages a slot 410 in a cylindrically shaped member 409 connected to spindle 399 by a pin 408. Thus shaft 120 is locked against rotation until lock 126 is unlocked by key 163.

Lug 404a after passing between fingers 122a and 122b (Figure 11A) extends forwardly into a slot 128 (Figure 11) in a locking plate, generally indicated at 129. Locking plate 129 is slidably mounted for vertical movement with respect to the loading device on the front portion 122c (Figures 9 and 19) of bracket 122 by a pair of shoulder bolts 411 and 412 (Figure 11). Bolts 411 and 412 extend through vertical slots 130 and 131 in plate 129. Locking plate 129 has a portion 129a (Figure 23) which extends rearwardly from the inner edge of the locking plate across the inner face of bracket 122. This portion has a cam slot 132 cut therein which coacts with a key 133 formed on a key shaft 134 to actuate locking plate 129.

Key shaft 134 is rotatably mounted in holes in an ear 135 (Figure 11) extending forwardly from the outer edge of side wall 60 and in bracket 122. Bracket 122 has a slot 122d (Figure 23) therein to accommodate key 133 and thus permit inward and outward movement of shaft 134. When the loading device is disconnected from the meter, shaft 134 is in the position shown in Figure 11. After the loading device is locked to the meter by counterclockwise movement of the locking plate 40 (Figure 13) hole 58 is clear and the key shaft 134 may be moved inwardly or to the right, as viewed in Figure 11. It moves a sufficient distance so that the left end of key 133 clears bracket 122, thus making key shaft 134 (Figure 11B) free to turn. As shaft 134 (Figure 23) is turned, key 133 cams locking plate 129 downwardly positioning lug 404a (Figure 11) in the horizontal section of slot 128.

Figure 11B:
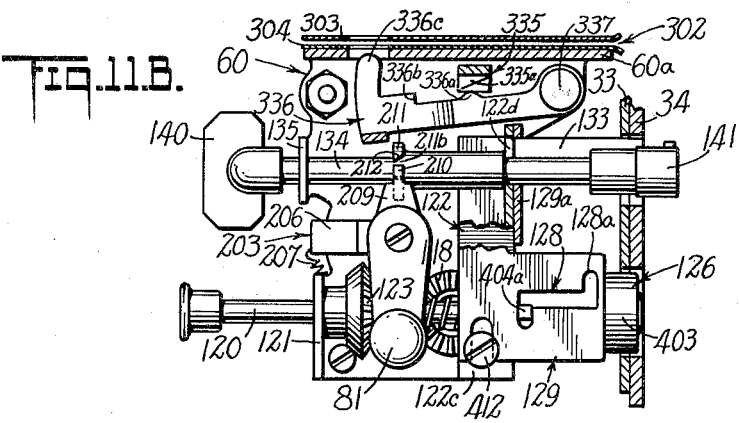
Figure 11 is a front elevation of the loading device with the casing removed.
Figure 11A is a front elevation of a portion of the loading device, some parts having been removed for purposes of clarification.
Figure 11C:
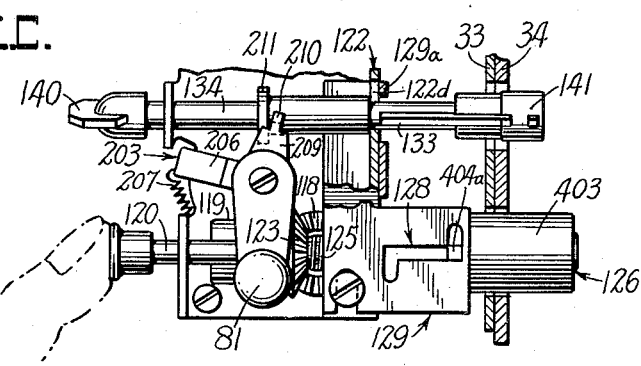
Figure 11D:
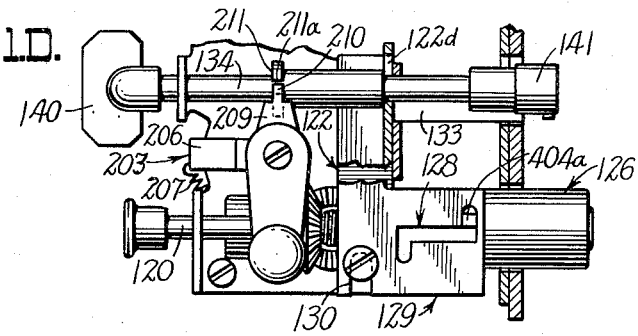
Figure 11E:
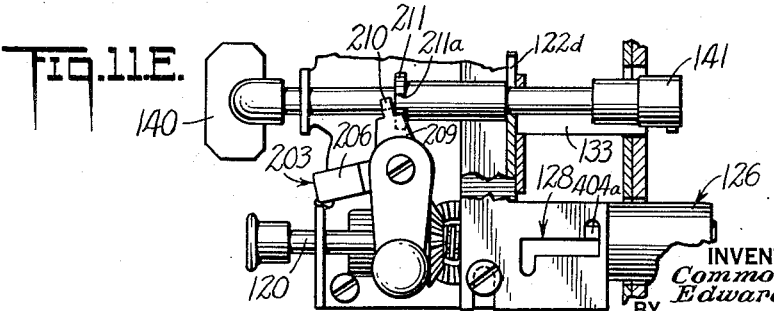

This frees lock 126 (Figures 9 and 11) and thus transfer shaft 120 so that they may both be moved inwardly until bevel pinion 123 meshes with bevel pinion 118 (Figure 19). At this time, the key shaft 134 (Figure 23) is turned an additional amount in a counterclockwise direction, as viewed in Figure 23, and lug 404a (Figure 11) is then positioned in the upwardly extending portion 128a of slot 128 (Figures 11 and 11E). This locks the transfer shaft in an inward position in which the bevel pinions are in mesh.

Locking plate 129 has an additional function in that it moves pawl 95d out of engagement with ratchet wheel 72 (Figure 21). Leg 95b (Figure 9) of bracket 95 has a portion 420 extending forwardly therefrom through a slot 421 in side wall 60. Portion 420 (Figure 23) is positioned beneath the lower edge of the rearwardly extending portion 129a of locking plate 129, and thus as locking plate 129 moves downwardly, it strikes portion 420 moving bracket 95 in a counterclockwise direction, as viewed in Figure 21, to disengage pawl 95d from ratchet wheel 72. This frees shaft 65 so that the counter wheels may be moved in a clockwise direction, as viewed in Figure 18, and the load in the loading device may then be transferred from counter wheel gear 68a through gear 84 (Figure 18A), gear 114 (Figure 19), bevel pinions 118 and 123, and shaft 120 into the meter.

When key shaft 134 is turned in a clockwise direction, as viewed in Figure 23, a spring 137 connected by a bracket 138 (Figure 11) to the forwardly extending portion 60a (Figure 20) of side wall 60 and connected to a pin 139 on locking plate 129 moves locking plate 129 upwardly. This moves lug 404a (Figure 11) into the horizontal portion of slot 128. At this time spring 125 (Figures 9 and 19) moves shaft 120 to the right, as viewed in Figure 19, breaking the connection between bevel pinions 117 and 123. When the lug 404a (Figure 11) reaches the left-hand end of slot 128 (Figure 11), spring 137 pulls the locking plate 129 upwardly so that lug 404a is positioned in the downwardly extending portion of slot 128. This again locks the transfer shaft 120 against movement inwardly into the meter.

As described hereinabove, after the loading device is locked in position on the meter 31, key shaft 134 (Figure 1) is moved inwardly by means of its handle 140, which at this time occupies the position in which it is shown in Figure 1. At this time the cylindrically shaped key 141 (Figures 11 and 13) enters a cylindrically shaped key slot 142 (Figure 12) in a lock, generally indicated at 143, mounted on the side wall 144 of the meter. This lock has a cylinder 145 which is freed from the lock casing 146 by key 141. A slot 147 (Figure 12) is formed in cylinder 145 and this coacts with a lug 141a (Figure 13) on key 141 so that when key shaft 134 is turned, the cylinder 145 of lock 143 turns with it. Lock 143 (Figure 7) is mounted in a rectangular shaped block 167 secured to the side wall 144 of the meter.

Key shaft 134 is turned approximately one-half of a revolution in a counterclockwise direction (Figure 23) in actuating locking plate 129, and thus a gear segment 148 (Figure 5) connected to the inner end of lock cylinder 145 also makes one-half a revolution in a counterclockwise direction. This movement of gear segment 148 moves a Geneva rack slide, generally indicated at 149 (Figure 5) upwardly, and this rack slide acts through a yoke, generally indicated at 160 (Figures 7 and 9) to move transfer pinion 161 (Figures 6 and 7) to a position where it does not lock counter wheel 181 against rotation. Movement of Geneva rack slide 149 also acts through a portion thereof to move a shutter, generally indicated at 162 (Figure 12), and thus expose a key 163 through which the load is transferred from the loading device to the meter register via transfer shaft 120. Movement of Geneva rack slide 149 also moves a locking pin 164 (Figures 6, 8, and 9) out of engagement with a notch in locking disc 165.

Geneva rack slide 149 (Figure 7) is mounted between block 167 and a support 150 which is also secured at 151 to the side wall 144 of the meter. The Geneva rack portion 149a (Figures 5, 7, and 10) of Geneva rack slide 149 extends forwardly over the inner face of lock 167 and the U-shaped body of the slide 149 includes a center portion 149b which extends outwardly adjacent the rear face of block 167 and two leg portions 149c and 149d. A slot 152 is provided between the meter side wall 144 and support 150 to accommodate portion 149d of rack 149. Support 150 has an inwardly extending portion 150a, the forward surface of which is spaced from and parallel to block 167. This forms a vertical slot between block 167 and support 150 to accommodate the center portion 149b of Geneva rack slide 149. The other leg portion 149c of slide 149 extends rearwardly in the same plane as the Geneva rack portion 149a of the slide.

As is best shown in Figure 12, leg portion 149d includes a pair of rearwardly extending arms 168 and 169 having a slot therebetween. The shutter 162 is pivotally mounted on the side wall of the meter by a shoulder screw 171. This shutter has a pin 170 (Figures 10 and 12) thereon which extends inwardly between arms 168 and 169, and as arms 168 and 169 move upwardly with Geneva rack slide 149, shutter 162 uncovers key 163 and when the slide moves in the reverse direction, the shutter covers the key.

A yoke, generally indicated at 160 (Figure 9), includes a pair of rods 174 and 177 connected by a bar 178. Rods 174 and 177 are mounted for sliding movement with respect to the meter in holes in meter supporting plate 176 and meter end wall 175. Rod 174 has a pin 173 which coacts with a cam slot 172 (Figures 5 and 10) in portion 149c of slide 149 to move rod 174 and thus yoke 160 forwardly and rearwardly with respect to the meter. Thus, as slide 149 is moved upwardly by gear segment 148, cam slot 172 (Figures 5 and 10) acts upon pin 173 to move yoke 160 rearwardly, and when the slide 149 is moved downwardly, then shifter yoke 160 is moved forwardly.

Shifter rod 177 (Figure 9) has secured thereto a yoke, generally indicated at 179, the arms 179a and 179b of which extend upwardly on opposite sides of transfer pinion 161 (Figure 7). This pinion is freely mounted on shaft 430 and normally acts as the transfer pinion between the dollars counter wheel 180 and the tens of dollars counter wheel 181 in the meter. Transfer pinion 161 is of similar construction to the transfer pinions in the loading device and thus is normally prevented from rotating because two of its four full-size teeth 182 ride on the periphery of a Geneva sliding disc 183. As shifter yoke 160 moves rearwardly, it acts through arms 179a and 179b of yoke 179 (Figure 7) to move transfer pinion 161 rearwardly (downwardly in Figure 7) and thus move the full-size teeth 182 out of contact with the disc 183. This permits pinion 161 which engages the gear 181a of counter wheel 181 and which before was locked against rotation by Geneva slide disc 183 to be rotated freely as counter wheel 181 is turned.

As will be described fully hereinafter, shaft 184 (Figures 6, 8, and 9) turns with transfer shaft 120 when a load is being transferred from the loading device to the meter. Shaft 184 has a locking disc 165 secured thereto which, when a load transfer is not being made, is positioned in a recessed portion 167a (Figure 6) of block 167. Locking disc 165 has a series of notches 165a (Figure 8) therein which coact with a bolt 164 to prevent rotation of disc 165 and thus shaft 184. Bolt 164 is mounted for horizontal movement in cut-out portions in block 167, side wall 144, and plate 34 (Figures 6 and 8) and this bolt has a forwardly extending portion 164a which enters one of the notches 165a in locking disc 165 when the bolt is in the position shown in Figures 6 and 8. Bolt 164 also has a rearwardly extending pin 164b thereon which coacts with a cam slot 185 (Figure 6) in the center portion 149b (Figure 7) of Geneva rack slide 149 to move bolt 164 outwardly and inwardly as the cam slot is raised and lowered. Thus, as gear segment 148 moves Geneva rack slide 149 upwardly (Figures 5 and 10), cam slot 185 coacts with pin 164b to move bolt 164 outwardly (Figure 9) and thus free its forwardly extending portion 164a from locking disc 165. This frees shaft 184. When the Geneva rack slide is moved in the opposite direction, bolt 164 is moved inwardly where it coacts with a notch 165a in disc 165 to again lock shaft 184 against rotation. This prevents rotation of shaft 184 when the meter has not been conditioned for operation by key 141 on key shaft 134 (Figure 11).

Operation of the meter during loading is prevented by the action of Geneva rack 166 (Figure 5). This rack has a body portion 166a (Figures 5 and 7) which is mounted between the forward side of block 167 (Figure 7) and a bracket 187. Body portion 166a has a rack portion 166b extending rearwardly from body portion 166a over the inner face of block 167 (Figures 5 and 7) and a finger 166c which lies in the same plane as rack portion 166b and extends downwardly from the body portion 166a of the Geneva rack. A bracket 186 (Figures 5, 5A, and 10) is mounted on the side wall 144 of the meter and its forward surface 186a (Figures 5A and 10) is in alignment with the forward surface of block 167. Bracket 186 coacts with block 167 to form supports for Geneva rack 166 (Figure 5). Bracket 187 (Figures 5 and 7), which is secured to side wall 144 and has portions 187a (Figures 5 and 7) and 187b (Figure 5A) following the contour of Geneva rack 166, holds the rack in position on block 167 and bracket 186.

During loading and also when the loading device is disconnected from the meter, Geneva rack 166 (Figure 5) is held in a downward position by the coaction of rack 166 and gear segment 148. When rack 166 is in a downward or locked position, its finger 166c acts on a projection 188a on a collar 188 secured to control shaft 1492 to hold shaft 1492 turned in a clockwise direction (Figure 5) against the action of a spring 800 resiliently urging movement of shaft 1492 in the opposite direction. Control shaft 1492, which forms a part of the mechanism of the meter shown in the above-mentioned patent, has a locking finger 1531 (Figures 3 and 3A) mounted thereon. Locking finger 1531 coacts with a locking notch 1533 formed in a locking collar 1534 keyed to countershaft 1044. Countershaft 1044 is geared to the main driving shaft of the meter and thus when countershaft 1044 is prevented from turning, the meter cannot be run. Thus, when rack 166 (Figure 5) is positioned in a downward or locked position, finger 166 acts through collar 188 and shaft 1492 to hold locking finger 1531 in the locking notch 1533 of locking collar 1534, thus preventing rotation of shaft 1044. When gear segment 148 (Figure 5) is turned one-half of a revolution in a counterclockwise direction from the position shown in Figure 5, to condition the meter for loading, rack 166 is not moved and thus the meter is locked against operation during loading. Thus, referring to Figure 1, key 140 is turned in the direction of the word "Load" to condition the meter for loading. After the load has been transferred from the loading device to the meter, then key handle 140 (Figure 1) is turned approximately a revolution in a counterclockwise direction (Figure 1) from the "Load" position of gear segment 148. This positions key handle 140 (Figure 1) in a "Run" position. As gear segment 148 is turned in a clockwise direction (Figure 5) from a "Load" position to a "Run" position, the descending register is first conditioned for operation as rack 149 is moved downwardly to the position it occupies in Figure 5. Continued movement of gear segment 148 in a clockwise direction next moves rack 166 upwardly, relieving the pressure of finger 166c on projection 188a. This permits shaft 1492 to be turned by the spring means described herein above in a counterclockwise direction (Figure 5), thus moving finger 1531 out of notch 1533 (Figure 3A) and freeing the meter for operation. The loading device may be removed from the meter at any time, but whenever it is, gear segment 148 must be turned to the position it occupies in Figure 5 before the key shaft 134 may be withdrawn from the meter. Thus the meter is always locked during loading and when the loading device is not mounted on the meter.

As described hereinabove, the meter is conditioned for loading by turning key 140 (Figure 1) in a "Load" direction from its "Off" position. After key shaft 134 (Figure 1) has been turned in a "Load" direction a certain distance, lug 404a (Figure 11) is positioned in the horizontal portion of slot 128 and thus transfer shaft 120 (Figure 9) may be pressed inwardly. Inward movement of transfer shaft 120 is permitted because during the turning of key shaft 134, Geneva rack slide 149 (Figure 10) moves shutter 162 (Figure 12) to uncover key 163. As cylindrically shaped key 163 (Figure 9) enters lock 126 because of the inward movement of shaft 120, it frees spindle 399 (Figure 19) from its locked position. Lug 163a on key 163 (Figure 12) enters slot 410 (Figure 19) in member 409 to form a driving connection between spindle 399 and key 163. As spindle 399 is directly connected to the transfer shaft 120, a driving connection is thus formed between shaft 120 and key 163. Key 163 (Figure 9) is slidably mounted in block 167 and is connected to shaft 184. The other end of this shaft is slidably mounted in a bore 190 formed in a bracket 191 connected to the framework of the meter. Bore 190 has a ball 192 therein resiliently pressed against the inner end of shaft 184 by a spring 193. When shaft 120 is pressed inwardly into engagement with key 163, member 409 (Figure 19) seats in key 163 (Figure 9). Further movement of the shaft 120 inwardly moves shaft 184 to the left, as viewed in Figure 9, against spring 193 until a bevel pinion 194 connected to shaft 184 meshes with a bevel pinion 195 rotatably mounted on a bracket 196 secured to the meter framework. Bevel pinion 195 is connected to a gear 197 (Figures 6 and 9) which meshes with the carry-over gear 181a (Figures 6 and 7) of counter wheel 181. Thus as shaft 120 (Figure 9) turns, a driving connection between this shaft and counter wheel 181 (Figures 6 and 7) is made by the engagement of lock 126 (Figure 9) and key 163, bevel pinions 194 and 195, and gear 197. By the inward movement of shaft 120 (Figure 11) lug 404a is positioned at the inner end of slot 128. Key shaft 134 is then turned the rest of its half revolution to position lug 404a in the upwardly extending portion 128a of slot 128. Thus lock 126 is held in engagement with key 163 by lug 404a (Figures 9 and 11) as long as the transferring operation continues. When the parts are in this position, the extremity of key 133 (Figure 23) rests against the bottom of cam slot 132 to hold locking plate 129 in its lower position (Figure 11D).

As described hereinabove, when handle 81 is turned in a clockwise direction, as viewed in Figure 11, counter wheel gear 68a (Figure 18A) also turns in a clockwise direction. Gear 68a is connected with gear 114 (Figure 18A) through pinion 84, and gear 114 acting through bevel pinions 118 and 123 (Figure 19) drives shaft 120. The meter tens counter wheel 181 (Figure 7) is driven from shaft 120 through the connections described hereinabove. Each time counter wheel 181 makes a complete revolution (Figure 7), transfer pinion 199 moves the hundreds of dollars wheel 200 one digit and each time the hundreds of dollars wheel makes a complete revolution, it acts through transfer pinion 201 to move the thousands of dollars wheel 202 one digit.

The gears and pinions described hereinabove are geared to insure the correct transfer of a sum from the loading device to the meter register. Counter wheel gear 68a (Figure 18A) is provided with twenty teeth or two for each digit. This gear meshes with a transfer pinion 84 carrying eight teeth and thus each time pinion 84 makes a revolution, counter wheel 68 moves four digits. Gear 84 meshes with gear 114 carrying twelve teeth and thus gear 114 makes two-thirds of a revolution for each revolution of gear 84. Bevel pinion 118 has twelve teeth (Figure 19) and pinion 123 has sixteen. Thus as pinion 118 makes two-thirds of a revolution with gear 114, pinion 118 turns a distance of eight teeth each time and pinion 123 and shaft 120 make one-half of a revolution. Thus, one-half of a revolution of shaft 120 is the equivalent of four digits on the loader register.

Pinion 194 (Figure 9) on shaft 184, which turns with shaft 120, has sixteen teeth and this meshes with pinion 195 having twelve teeth. Thus, one-half of a revolution of shaft 184 results in two-thirds of a revolution of pinion 195. Gear 197, which turns with pinion 195, has twelve teeth and thus is turned a distance of eight teeth each time transfer pinion 84 (Figure 18A) makes a revolution. As gear 197 meshes with counter wheel gear 181a (Figure 6), having twenty teeth, two teeth representing one digit, counter wheel 181 is moved a distance of four digits which is the same amount that counter wheel 68 moves each time pinion 84 makes a revolution. Thus suitable gearing is provided to accurately transfer the sum loaded into the loading device from the loading device into the meter register.

Suitable mechanism is provided to prevent the meter register from being overloaded. This includes a pin 600 (Figure 7) on counter wheel 202 which strikes a stop 601 when the 9 on this counter wheel is positioned at the top of the register. If this construction were not included, a person might purchase more postage than could be loaded in the register of the meter. For example, if the maximum the register will hold is $9,999.99 and there was $3,000 on the register and a person tried to load $8,000 into the register, then the register would be turned past the $9,999.99 reading to a reading of $1,000. This would mean a loss to the user of $10,000. Pin 600 and stop 601 prevent this because when the register has reached $9,999.99, it isn't possible to load any more postage into the register.

Referring to Figures 11 and 17A, a locking bracket, generally indicated at 203, is provided to insure that a load is completely transferred to the meter register before the loading device can be disconnected from the meter or the meter conditioned for operation. Bracket 203, which is U-shaped, includes a center portion 204 and a pair of legs 205 and 206 (Figure 17A). Leg 206 has a yoke formed on its end including a center portion 206a and legs 206b and 206c. Legs 206b and 206c mount bracket 203 on transfer pinion shaft 78. Bracket 203 extends outwardly around the outer end of side wall 60 from its point of connection to shaft 78 and then its leg 205 curves under transfer pinion shaft 78, as is best shown in Figure 12. The inner end of leg 205 is positioned beneath a lug 101d (Figures 9 and 18) extending outwardly from the outer end of center portion 101a of zero lock bracket 101. A spring 207 (Figure 17) connected to the center portion 204 of bracket 203 and to spacer 14 resiliently urges movement of bracket 203 in a clockwise direction, as viewed in Figure 18, about shaft 78 as a pivot point. Thus, spring 207 resiliently holds the inner end of leg 205 in contact with the under surface of lug 101d.

Referring to Figure 17, leg 206c of bracket 203 has an arm 209 extending upwardly therefrom. This arm has an inwardly curved finger 210 on its upper end which coacts with a collar 211 secured to key shaft 134 (Figure 11) when key shaft 134 is moved to its inner position (Figure 11B). Collar 211 is provided with a pair of notches 211a and 211b (Figure 17). When shaft 134 is first moved inwardly (Figure 11B), finger 210 is positioned in notch 211b. As shaft 134 is moved in a clockwise direction, as viewed in Figure 17, finger 210 (Figure 11B) strikes cam surface 212 of notch 211b, and this surface cams finger 210 to the right, as viewed in Figure 11B, against the tension of spring 207 so that finger 210 is resiliently pressed against the right-hand side of collar 211 (Figure 11C).

After key shaft 134 has been turned one-half of a revolution or to a "Load" position (Figure 11D), spring 207, which is resiliently urging movement of bracket 201 in a counter-clockwise direction, causes finger 210 to enter notch 211a. Further movement of bracket 203 in a counter-clockwise direction (Figure 11D) this time is prevented by leg 205 (Figure 18) which is in contact with the under surface of lug 101d on bracket 101. Finger 210, because of its position in notch 211a, prevents turning of key shaft 134 in either direction and thus the loading device may not be removed from the meter. As described hereinabove, when the counter wheels reach zero position, the zero lock bracket 101 (Figure 18) moves upwardly as its fingers 103, 104, and 105 (Figure 20) enter the notches in the zero lock discs of the counter wheels. When center portion 101a of zero lock bracket 101 moves upwardly, spring 207 pulls bracket 201 in a counterclockwise direction (Figure 11E). This moves finger 210 out of notch 211a, thus freeing key shaft 134 so that the shaft 134 may be turned in the "Run" direction (Figure 1) to condition the register for registration and unlock the meter. Thus bracket 203 coacts with collar 211 to insure transfer of the complete load from the loading device before the loader can be removed. As described above, the meter is locked as long as a load is being transferred to the meter. Consequently, the meter is locked until the entire load is transferred thereto. When the loading device is reloaded, finger 210 is moved to an upright position again (Figure 11) by bracket 101.

Suitable mechanism is provided both in the meter and in the loading device for making a record directly from the counter wheels of the meter and the loading device registers. The record is made on a card, generally indicated at 213 (Figure 1), which includes a body portion 213a and a tongue portion 213b, on which recordings are made from the meter register and from the loader register, respectively. The card 213 is inserted in a slot (not shown) in the right-hand side wall of the meter, as viewed in Figure 1, and this slot is in alignment with a chute, generally indicated at 214 (Figure 27), which includes upper and lower guide plates 215 and 216 horizontally positioned in the meter.

Referring to Figures 12 and 26, guide plates 215 and 216 are maintained in spaced relationship by spacers 217 and 218 which extend longitudinally of the guide plates adjacent the front and rear edges thereof. Guide plates 215 and 216 are held in assembled relationship with spacers 217 and 218 by a series of screws (not shown) passing downwardly through them.

The ends of chute 214 (Figure 27) are supported by a pair of bars 219 and 221 which are secured to the framework of the descending and ascending registers of the meter, counter wheels of which are shown at 200 and 223. The center portion of chute 214 rests upon another portion 415 of the register framework extending transversely across the chute. As is best shown in Figure 27, chute 214 curves downwardly over the counter wheels of the ascending and descending registers. Guide plates 215 and 216 have slots 272 and 273 cut therethrough in alignment with the counter wheels in both the ascending and descending registers. These slots permit contact between the printing impression wheels 239 and 244 and the counter wheels of the registers, such as counter wheels 200 and 223.

The portions of lower guide plate 216 positioned between the slots 273 are cut free adjacent their right-hand ends, as viewed in Figure 27, and the free ends are turned downwardly to form resilient fingers 274 and 275. Resilient fingers 276 and 277 (Figure 26) of the same type are adjacent the forward and rear slots of each register. These fingers guide the recording card into chute 214 (Figure 27) and then when the impression wheels are moved downwardly into recording position and the impression taken, all as will be described hereinafter, these fingers permit the entire portion of the card above the registers to be moved downwardly. Thus, damage to the recording card by the edges of the slots is prevented. These fingers also move the card up after the impression is made and prevent the perforations in the card from catching on the raised digits as the card is removed. To prevent the card from catching on the right-hand ends of the slots, as viewed in Figures 26 and 27, when it is being removed from the chute 214, a series of tongues 460 and 461 are provided. These tongues extend a slight distance into the slots and have their ends turned downwardly. Thus the right-hand edges of the slots, as viewed in Figure 26, cannot interfere with the withdrawal of the card.

The impression wheel carriage is mounted for transverse movement with respect to the meter on a pair of supporting members 224 and 225. Supporting members 224 and 225 are secured to the framework of the register by screws 226 and 227 (Figures 26 and 3). The impression wheel carriage has a framework including a pair of side bars 228 and 229, which are held in spaced relationship by spacing bar 230 and spacing rod 231. Impression wheel supports, generally indicated at 232 and 233, are pivotally mounted on side bars 228 and 229 and coact with the registers positioned therebeneath to make a record on the card inserted in chute 214 when the impression wheel carriage is actuated. The impression wheel supports 232 and 233 are of substantially similar construction and are actuated in substantially the same manner.

Support 232 includes a body 234 of rectangular shape, pivotally mounted on side bars 228 and 229 adjacent its left-hand edge 234 (Figure 26) by stud shafts 236 and 237. This permits pivotal movement of the right-hand portion of support 232, as viewed in Figure 27, upwardly and downwardly with respect to the counter wheels positioned therebeneath. Support 232 has a series of slots 238 cut into its left edge, as viewed in Figure 26. These slots are positioned in support 232 in alignment with the counter wheels of the register positioned therebeneath and a series of impression wheels 239 are rotatably mounted in the slots on a shaft 240 which extends through the body 234 of support 232 adjacent its right-hand edge, as viewed in Figures 26 and 27.

Impression wheel support 233 includes a body 241 pivotally mounted on side bars 228 and 229 by stud shafts 242 and 243. Impression wheels 244 are mounted in slots extending into the right-hand edge of support 233 on a shaft 470. These wheels are free to move upwardly and downwardly with respect to the counter wheels positioned therebeneath.

To mount the impression wheel carriage on supporting members 224 and 225, cam plates 246, 247, 248, and 249 are provided (Figures 26 and 27). These cam plates fit into recessed portions 250, 251, 252, and 253, cut into supporting members 224 and 225. Cam plates 246 and 247 have cam slots of similar shape therein. The cam slot 254 in cam plate 247 (Figure 27) has a substantially straight left-hand portion, curves downwardly, and then has an arc-shaped right-hand section. The curvature of this arc is complementary to the curvature of the counter wheels in the meter register. Stud shafts 236 and 237 have rolls 255 and 256 rotatably mounted thereon which are positioned in the cam slots in cam plates 246 and 247, respectively. These rolls are, as is shown in Figure 27, of a slightly smaller diameter than the width of the cam slots in the cam plates.

Slots, one of which is shown at 257 (Figure 27), are provided extending upwardly into side bars 228 and 229 to permit impression wheel shaft 240, which extends beyond side bars 228 and 229 (Figure 26) to move vertically relative to the side bars. A pair of rolls 258 and 259 are mounted on the ends of shaft 240 and these rolls are positioned in the cam slots in cam plates 246 and 247, respectively. The diameter of these rolls is also slightly smaller than the width of the cam slots in the cam plates. The other end of the carriage is mounted in a similar manner by rolls 261, 262, 263, and 264 (Figure 26) which are mounted on shafts 242, 243, and 470. These rolls are positioned in cam slots 265 similar to cam slots 254 (Figure 27) in cam plates 248 and 249 (Figure 26).

As the impression wheel carriage is moved transversely of the meter, the framework of the carriage and thus the left-hand edges of supports 232 and 233 are maintained in a horizontal position by rolls 255, 256, 261, and 262, in the horizontal portions of the cam slots in cam plates 246, 247, 248, and 249. As side bars 228 and 229 move to the right with respect to supporting members 224 and 225, the right-hand edges of supports 232 and 233 (Figure 26) are moved downwardly as rolls 258, 259, 263, and 264 follow the downwardly curved portions of the cam slots in cam plates 246, 247, 248, and 249. When the impression wheel carriage is moved a sufficient amount to bring the impression wheels into recording position with the counter wheels, the rolls on the ends of the impression wheel shafts 240 and 245 enter the arc-shaped portions of

19 the cam slots and thus cause the impression wheels to move over the curved surfaces of the raised digits on the counter wheels (Figure 27).

The impression wheel carriage is driven by a crank 220 positioned on the front of the meter. The hub 265 of this crank is keyed to a shaft which extends rearwardly through the meter beneath the right-hand ends (Figure 26) of side bars 228 and 229. This shaft is journaled in supporting members 224 and 225 and has a pair of pinions 267 and 268 mounted thereon. These pinions are positioned beneath and in engagement with racks, one of which is shown at 269 (Figure 27), formed on the lower edges of the right-hand ends of side bars 228 and 229, as viewed in Figure 26. Thus as shaft 226 is turned by crank 220, the impression wheel carriage is moved transversely of the meter.

Spacing bar 230 (Figures 12 and 26) has a spring, generally indicated at 270, mounted on the right-hand edge thereof, as viewed in Figure 26. This spring has an arc-shaped portion 271 which coacts with a pin 334 to actuate the impression wheel carriage of the loading device, all as will be fully described hereinafter.

The left-hand end of chute 214 (Figure 12) is in alignment with slots 300 and 301 (Figure 13) in supporting plate 34 and face plate 33, respectively. The tongue portion 213b (Figure 1) of card 213 passes through these slots and extends into a chute, generally indicated at 302 (Figure 18), horizontally positioned in the loading device. Chute 302 includes upper and lower guide plates 303 and 304 (Figures 17 and 18) which are maintained in spaced relationship with respect to each other by spacers 305 and 306 (Figure 17). Spacers 305 and 306 are positioned between the forward and rear edges of plates 303 and 304 and together with guide plates 303 and 304 are connected to the rearwardly extending portion 59a of side wall 59 and the forwardly extending portion 60a of side wall 60 by screws, one of which is shown at 307 (Figure 17).

Guide plates 303 and 304 are provided with slots 303a and 304a (Figure 20) above and in alignment with counter wheels 66, 67, and 68. Referring to Figures 18 and 20, the inner ends of the portions of guide plate 304 positioned between the slots therein are cut free and turned down (Figure 18) to form resilient fingers 304b. Furthermore, this guide plate is cut forwardly and rearwardly (Figure 20) from fingers 304b to form another pair of fingers 304c similar in construction to fingers 304b. These fingers on the lower guide plate are moved downwardly when an impression is being made on a card, and thus this portion of the guide plate does not interfere with the taking of an accurate impression from the counter wheels. These fingers also prevent interference between the card and the raised digits after an impression is made on the card as the card is withdrawn from the chute. These fingers and the guide plates forming chute 302 guide the card into recording position and the fingers, because their inner ends (Figure 18) are turned down, do not interfere with the leading edge of the card during its insertion.

As described hereinabove, the horizontal portions 60a and 59a (Figure 17) of the side walls 59 and 60 each have a pair of vertical ears 59b, 59c, 60b, and 60c (Figure 7) having right angle portions 59d, 59e, 60d, and 60e (Figures 7 and 17), to define the corners of the space in the upper portion of the loader where the impression wheel carriage is mounted. The impression wheel carriage includes a framework, generally indicated at 309 (Figure 7), mounted for movement away from and then toward the meter and an impression wheel support, generally indicated at 310, pivotally connected to the framework. A pair of cam plates 311 and 312 (Figures 3, 7, and 17) are secured respectively to ears 60b and 60c and ears 59b and 59c by nuts and bolts 480 (Figure 7).

Referring to Figure 7, the center portion of framework 309 is of rectangular shape and the framework extends both forwardly and rearwardly from this rectangular portion, thence outwardly adjacent cam plates 311 and 312 and thence forwardly and rearwardly again through slots 313 (Figure 11) and 314 (Figure 3). All of framework 309 (Figure 7) is of substantially the same vertical width (Figure 18) with the exception of the portions 309a and 309b (Figures 7 and 20) extending through the slots 313 and 314 (Figures 11 and 3) in cam plates 311 and 312. A pair of positioning pins 315 and 316 (Figure 7) are secured to and extend outwardly from the forwardly and rearwardly extending portions 309c and 309d of framework 309. Another pair of positioning pins 317 and 318 are mounted on portions 60e and 59e of ears 60c and 69b (Figures 7 and 17). A pair of springs 319 and 320 which are mounted on oppositely disposed pairs of positioning pins 315, 317, 316, and 318, act between the framework 309 and portions 59e and 60e to resiliently urge the carriage to the left, or inwardly, as viewed in Figure 7. The reduced portions 309a and 309b of framework 309 limit the movement of the framework in this direction by their engagement with the inner ends of slots 313 and 314 (Figures 11 and 3). The portions 309e and 309f (Figure 7) of the framework, which extend outwardly adjacent cam plates 311 and 312, serve to guide framework 309 and maintain it in alignment with the counter wheels of the loading device as the framework is moved.

The impression wheel support 310 fits within the rectangularly shaped portion of framework 309 and is pivotally connected thereto by a pin 321 (Figure 18), which extends through support 310 (Figure 7) adjacent the outer edge thereof and into the sides 309g and 309h (Figure 7) of the framework 309. This permits the inner end of support 310 to move upwardly and downwardly with respect to the counter wheels of the loading device (Figures 7 and 18). Support 310 has a series of holes 322 (Figures 7 and 18) cut therethrough permitting the user to see the counter wheel digits (Figure 7) through a window 323 (Figure 1) when the impression wheel carriage is in a non-recording position.

Impression wheels 324, 325, and 326 are mounted in slots in support 310 immediately to the left of holes 322, as viewed in Figure 7. These wheels are rotatably mounted on a shaft 327 (Figures 7 and 18) which extends through support 310 and thence through cam plates 311 and 312. Slots, one of which is indicated at 328 (Figure 18), are cut in framework 309 to permit shaft 327 to move vertically with respect to framework 309. Cam wheels 329 and 330 (Figures 3, 7, and 11) are mounted on the ends of shaft 327 and ride in cam slots 331 and 332 formed in cam plates 311 and 312. Cam wheels 329 and 330 have annular portions 329a and 330a engaging cam plates 311 and 312 to hold the wheels in position. These cam slots are of a similar shape both extending downwardly and then following an arc having the same curvature as the counter wheels.

As described hereinabove, the impression wheel carriage of the loading device is actuated by the impression wheel carriage of the meter (Figure 26) through a spring 270. This spring acts against the inner end of a pin 334 (Figures 2, 7, and 18) secured to framework 309 and extending through holes in the loading device face plate 33 and supporting plate 34. When the meter impression wheel carriage is moved to make an impression by turning crank 220 (Figure 1), spring 270 (Figures 12 and 26) acts on pin 334 to move the impression wheel carriage to the right, as viewed in Figure 7. As the carriage moves to the right against the compression of springs 319 and 320, the inner end of support 310 and thus impression wheels 324, 325 and 326 is moved downwardly as cam wheels 329 and 330 follow their respective cam slots 331 (Figure 11) and 332 (Figure 3). When the impression wheels reach impression-making position, because of the arc shape of the outer portions of the cam slots, they follow the curved surfaces of the raised digits (Figure 18) of their respective counter wheels. After the record is made, the meter impression wheel carriage is retracted, and springs 319 and 320 (Figure 7) move the loading device impression wheel carriage back to a position permitting the digits on the counter wheels to again be viewed.

Ridges 500 (Figures 20A and 20B) are formed on the surfaces of the raised digits on the counter wheels in both the meter and loading device. These ridges interfit with ridges 401 (Figure 20B) extending around the impression surface of the meter and loading device impression wheels (Figures 7, 20B, and 26). As the impression wheels roll over the raised digits, the ridges cut into the card to record thereon the shapes of the digits. This makes a permanent record of the positions of both loading device and the meter registers. If desired, a recording card composed of two sheets, one having carbon black thereon, may be used. When this type of card is used, an impression is made by the digits on one sheet and a carbon copy is made on the other sheet by the carbon black.

Portions 309e (Figure 7) of impression wheel framework 309 has an actuating finger, generally indicated at 335, extending downwardly therefrom (Figures 11, 17, and 20). As is best shown in Figure 20, this finger extends downwardly, thence rearwardly beneath the horizontal portion 60a of side wall 60, and thence downwardly again to form an actuating portion 335a (Figure 20) which coacts with a locking arm, generally indicated at 336 (Figures 11 and 20). Locking arms 336 is pivotally mounted on side wall 60 (Figure 11B) by a pin 337 and has both a cam surface 336a and a stop 336b formed on its upper edge. Cam surface 336a and stop 336b coact with the lower end 335a of actuating finger 335 to actuate a recording card chute blocking finger 336c and to limit the outward movement of the impression wheel carriage when a card is not inserted in the recording card chute. Blocking finger 336c (Figures 11 and 17) extends upwardly from the outer end of arm 336 and its upper end is in alignment with holes 340 (Figure 7) through guide plates 303 and 304.

A spring 338 (Figures 11 and 17) connected to the outer end of locking arm 336 and to a lug 339 on the horizontal portion 60a of side wall 60 (Figure 17) resiliently urges locking arm 336 and thus finger 336c upwardly. When the carriage 309 (Figure 11) is in its rest position, as shown in Figure 7, the actuating finger 335 (Figure 11B) acts upon cam surface 336a to hold locking arm 336 in the position shown in Figures 11 and 11B, thus preventing finger 336c (Figure 17) from blocking the passageway between guide plates 303 and 304 (Figure 17). If a card is inserted in the chute between guide plates 303 and 304, when the locking arm is in the position shown in Figures 11 and 11B, and then the impression wheel carriage 309 is moved to the left, as viewed in Figure 11, locking arm 336 cannot move upwardly because the upper end of finger 336c strikes the under surface of the recording card. However, if a recording card is not inserted in the chute, spring 338 (Figures 11 and 11B) moves locking arm 336 upwardly after the lower end portion 335a of actuating finger 335 moves to the left of cam surface 336a. Next the lower end portion 335a of locking finger 335 contacts stop 336b, thus preventing further movement of the impression wheel carriage to the left, as viewed in Figure 11.

Referring now to Figure 7, portion 309f of framework 309 extends downwardly and thence rearwardly to form a locking finger, generally indicated at 341 (Figures 20 and 23). The rearwardly extending portion 341a of locking finger 341 coacts with a locking plate, generally indicated at 342 (Figures 3 and 4) to lock the impression wheel carriage in an outer or impression-making position under certain circumstances. Locking plate 342 is pivotally mounted on side wall 59 by a screw 343 extending through side wall 59. A spring 344 (Figures 3 and 17) mounted on a collar on screw 343 has one end acting against the portion 59e of ear 59 and the other end acting upon the under surface of locking plate 342 to resiliently urge the locking plate to pivot in a clockwise direction, as viewed in Figure 3. As is best shown in Figure 17, plate 342 extends rearwardly at a point adjacent screw 343 and thence inwardly parallel to side wall 59 (Figure 3). Plate 342 is provided with a spacing finger 345 (Figures 3 and 23) which extends forwardly from plate 342 and rides over the rear face of side wall 59. A blocking finger 346 (Figure 23) extends forwardly from plate 342 adjacent the upper inner end thereof, as viewed in Figure 3, passes through a cut-out portion in side wall 59, and thence extends upwardly (Figure 23) in alignment with a pair of holes (not shown) in chute guide plates 303 and 304.

The upper edge of locking plate 342 includes a cam surface 342a (Figure 3) which coacts with the rearwardly extending portion 341a of locking finger 341 to hold locking plate 342 in a position in which blocking finger 346 does not obstruct the passageway between guide plates 303 and 304 (Figure 23). When the impression wheel carriage is moved to the right, as viewed in Figures 3 and 7, locking finger 341 moves over a cut-out portion 342b in locking plate 342 and spring 344 pivots plate 342 in a clockwise direction. If a recording card has been inserted in the chute of the loading device, finger 346 (Figures 3 and 23) strikes the under surface of this card and prevents locking plate 342 from moving upwardly. However, if the card in the meter is perforated in alignment with finger 346, then locking plate 342 moves upwardly, finger 346 passing through the perforated hole in the recording card, and the impression wheel carriage is locked in a right-hand position, as is shown in Figure 4, by the engagement of the rearwardly extending portion 341a of locking finger 341 in the cut-out portion 342b of locking plate 342. When locking position is reached, the loading device impression wheels (Figure 18) are in contact with the raised digits on the counter wheels, thus securely locking the recording card within the loading device chute. Furthermore, the blocking finger 346 on the locking plate 342 (Figure 4) is positioned in the perforation in the recording card and also prevents its removal from the loading device. Thus, when the loading device is removed from the meter, the recording card is locked in it, and accordingly is taken to the Post Office with the loading device.

An arm 525 (Figure 4) is provided to move locking plate 342 downwardly releasing locking finger 341 and thus the impression wheel carriage. Arm 525 is secured to the rear end of shaft 94 (Figures 9 and 23) and extends upwardly (Figure 4) so that its outer end is positioned above a lug 342e extending forwardly from locking plate 342 (Figures 4 and 23). As described hereinabove, bracket 98 (Figure 18) is keyed to shaft 94 and is moved in a clockwise direction, as viewed in Figure 18 when arm 525 acts upon lug 342e to move plate 342 downwardly and thus release locking finger 341. At the same time finger 346 on plate 342 is withdrawn from the hole in the recording card. Springs 319 and 320 (Figure 7) then move the impression wheel carriage 309 inwardly to release the recording card from the grip of the impression wheels.

Locking arm 336 (Figures 11 and 11B) coacts with locking plate 342 (Figure 3) to prevent the impression wheel carriage from being locked in a recording position when a recording card is not positioned in the loading device chute. Stop 336b (Figure 11) is positioned to stop outward movement of the printing carriage at a point before locking plate 342 (Figure 3) moves upwardly to place portion 341a of locking finger 341 in the cut-out portion 342b thereof. When a recording card is positioned in the loading device chute, locking arm 336 (Figures 11 and 11B) is prevented from moving upwardly because its finger 336c strikes the under surface of the card. This prevents stop 336b from interfering with outward movement of the impression wheel carriage when a card is in the loading device chute.

To prevent removal of the loading device from the meter before a card has been inserted and an impression has been taken of the position of the counter wheels, a locking arm, generally indicated at 347 (Figures 13, 15 and 16), is provided. This locking arm is pivotally mounted on face plate 33 by a pivot pin 348 (Figures 13 and 4). A spring 349 (Figures 15 and 16) mounted on pin 348 and contacting the lower surface of a lug 347a on locking arm 347, resiliently urges movement of the locking arm in a counter-clockwise direction, as viewed in Figures 15 and 16. Thus, the left end 347b of arm 347 is resiliently urged into contact with the upper edge of locking plate 40.

When the locking plate 40 is in its unlocked position, as shown in Figure 16, the left end of arm 347 is supported by the edge 40a of the locking plate. This holds a locking finger 347c (Figures 16 and 23) extending upwardly from the other end of arm 347 out of a blocking position in the card chute on the loading device via holes aligned therewith in guide plates 303 and 304 (Figure 23). Locking arm 347 does not prevent counterclockwise movement of the locking plate, as viewed in Figure 15, as the corner 40b of the locking plate cams against the under edge of the left-hand portion of locking arm 347 moving the locking arm in a clockwise direction to the position shown in Figure 13. At this time the loading device is locked on the machine and the blocking finger 347c is not positioned in the path of a recording card.

However, if removal of the loading device from the meter without first inserting a recording card in the chute is attempted, during counterclockwise movement of the locking plate 40, locking arm 347 (Figure 15) is pivoted by spring 349 so that its portion 347b strikes against the side wall of a cut-out portion 40c in plate 40. This prevents the locking portions of the locking plate from being completely withdrawn from the locking pins 36 and 37, and thus the loading device may not be disconnected from the meter. However, if a card is inserted in the loading device, as is shown in Figure 16, pivotal movement of locking arm 347 is prevented. Then, locking plate 40 may be turned in a clockwise direction a sufficient amount to free the locking portions thereof from the positioning pins, and the loading device may then be removed from the meter. Thus, the inclusion of locking arm 347 on the loading device requires the insertion of a recording card in the loading device chute before it can be removed from the meter.

In operation, the loading device (Figure 2) is taken to the post office. The clerk at the post office breaks the seal 520, permitting him to open cover 521. Through the hole thus exposed in the casing of the loading device, he inserts a key 110 (Figures 3 and 18) into the lock 109 of the loading device. By turning key 110, arm 108a acts through bracket 98 (Figure 18) to move the zero lock fingers 103, 104, and 105 (Figure 20) out of the notches in the locking discs of the counter wheels and also disengages pawls 95d and 99a (Figures 21 and 22) from ratchet wheels 72 and 73. This frees shaft 65 and permits the driving of counter wheel 68 through this shaft, gears 76 and 77 (Figure 3), and transfer pinion shaft 78 (Figure 17A) by handle 81 (Figure 7). The operation of the lock 109 also releases the recording card locked to the loader.

The clerk turns handle 81 in a counterclockwise direction, as viewed in Figure 1, until the sum of the postage purchased is visible through the window 323 on the counter wheels of the loading device. After the counter wheels have been set in the correct position, the clerk turns lock 109 to the position shown in Figure 18, thus placing the pawls 95d and 99a (Figures 21 and 22) and locking fingers 103, 104, and 105 (Figure 20) in operative condition.

The user then attaches the loading device to his meter (Figure 1) by placing it on positioning pins 36 and 37 (Figure 16) and rotating locking plate 40 in a counterclockwise direction. This uncovers the hole 58 (Figure 2) in the face plate 33 of the loading device, permitting the user to move key shaft 134 (Figure 11) inwardly into engagement with the lock 143 (Figure 7) mounted on the meter. Then by turning the key shaft 134 in a clockwise direction (Figure 20), gear segment 148 (Figure 5), acts to move transfer pinion 161 (Figure 7) from transfer position through Geneva sliding rack 149 (Figures 5 and 9), cam slot 172, pin 173, and yoke 160. Movement of Geneva sliding rack 149 also withdraws bolt 164 from locking engagement with locking disc 165 secured to meter transfer shaft 184. A further function performed by Geneva rack 149 is to move shutter 162 (Figure 12) in a clockwise direction to uncover a key 163 mounted on the outer end of shaft 184 (Figure 9).

As shown in Figure 23, when key shaft 134 (Figure 23) is turned, key 133 thereon acts on cam slot 132 to move locking plate 129 (Figure 11B) downwardly. This positions lug 404a on lock 126 in the horizontal portion of slot 128 in locking plate 129. At this time shaft 120 (Figures 9 and 11C) is pressed inwardly until lug 404a is positioned in the right-hand end of slot 138, as viewed in Figure 11C. Then the user completes turning shaft 134 to position lug 404a in the upwardly extending portion of slot 128 (Figure 11D). At this time shaft 120 is locked in an inward position (Figure 19) with its bevel pinion 123 in engagement with bevel pinion 118. At the same time a driving connection is established between loading device transfer shaft 120 and the meter transfer shaft 184 (Figure 9), and bevel pinions 194 and 195 are moved into engagement. During the downward movement of locking plate 129 (Figure 23) it acts upon a lug 420 on bracket 95 to move pawl 95d out of engagement with ratchet 72 (Figure 21). Thus at this time shaft 65 is free to move in a counterclockwise or load transferring direction, as viewed in Figure 21.

The load is then transferred by the user to the register (Figure 7) in the meter by turning handle 81 (Figure 11) in a clockwise direction. This turns the counter wheels of the loading device so that the load in the loading device is descending or the counter wheels thereof are moving toward zero position. The drive into the meter takes place from counter wheel 68 (Figure 17) through transfer pinion 84 (Figure 18A), gear 114, bevel pinions 118 and 123 (Figure 19), shaft 120, shaft 184 (Figure 9), bevel pinions 194 and 195, and from gear 197 to counter wheel 181 (Figures 6 and 7).

When the loading device register reaches zero position, the locking fingers 103, 104, and 105 (Figure 20) enter the locking discs of the counter wheels in the loading device, locking the counter wheels and thus the loading device against further operation. At this time locking finger 210 (Figure 11E) moves out of locking engagement with the slot in collar 211 secured to key shaft 134. This permits key shaft 134 to be turned in a clockwise direction, as viewed in Figure 23, and at this time key 133 releases locking plate 129, thus permitting spring 137 to move plate 129 upwardly. This moves the upwardly extending portion of slot 128 (Figure 11C) away from lug 404a to allow spring 125 (Figure 9) to move lock 126 out of engagement with the key 163.

As key shaft 134 (Figure 20) is turned in a counterclockwise direction, it acts through its key 141 (Figure 11) and lock 143 (Figure 7) to turn gear segment 148 in a clockwise direction (Figure 5). During the first part of its movement in this direction, it acts through Geneva rack slide 149, pin 173, and yoke 160 (Figure 9) to move transfer pinion 161 (Figure 7) to a position where it again acts as the transfer pinion between counter wheels 180 and 181. During this time bolt 164 (Figure 9) is moved inwardly by slide 149 so that it engages a notch in locking disc 165 (Figure 8). Geneva rack slide 149 also acts to move shutter 162 (Figure 12) in a counterclockwise direction so that it again covers key 163. During the last part of its counterclockwise rotation, gear segment 148 moves Geneva rack slide 166 upwardly moving finger 166c out of meter-locking position. At this time the meter is conditioned for operation.

When the loading device is to be removed from the meter, key shaft 134 (Figure 11B) is turned to its "Off" position (Figure 1) and at this time the key 133 thereof is in alignment with the slot 122d (Figure 23) in bracket 122, thus permitting withdrawal of the key shaft 134 outwardly into the loading device. This permits locking plate 40 (Figure 13) to be moved in a clockwise direction to an unlocked position (Figure 16). When plate 40 reaches the position shown in Figure 16, the hole 58 in face plate 33 through which the key shaft passes is closed by the locking plate and positioning pins 36 and 37 are freed so that the loading device may be detached from the meter. As described hereinabove, locking arm 347 coacts with locking plate 40 to prevent movement of locking plate 40 in a clockwise direction when a recording card is not positioned in the recording card chute of the loading device. Accordingly, before locking plate 40 can be moved to the position shown in Figure 16, a recording card must be inserted in the recording card chute of the loading device.

Referring to Figure 1, the recording card 213 is fed into the meter chute until the tongue 213b thereof is positioned in the recording card chute of the loading device and then the crank 220 is turned in a counterclockwise direction, as viewed in Figure 1. This moves the meter impression wheel carriage to the right, as viewed in Figure 26, causing the impression wheels 238 and 244 to move over the raised digits on the meter register and cut a record of the reading of the meter register on the recording card.

As the meter impression wheel carriage moves to the right, as viewed in Figure 26, it acts through spring 270 and pin 334 to move the loading device impression wheel carriage including the impression wheel support 310 to the right, as viewed in Figure 7. This causes the impression wheels 324, 325, and 326 to move over the raised digits on the loading device counter wheels to make a record of the position of the loading device register on recording card tongue 213b (Figure 1).

If a recording card having a hole punched therein to align with the upper end of finger 336c (Figure 17) on locking plate 342 (Figure 4) is used, then when the loading impression wheel carriage is moved to the right, as viewed in Figure 7, locking finger 341 (Figure 4) moves into engagement with locking plate 342 to lock the impression wheels in impression-making position and thus lock the recording card in the loading device. The recording card remains locked in the loading device until the loading device lock 109 (Figure 18) is operated at the post office. As described hereinabove, a locking finger 347 (Figures 13, 15 and 16) is provided to prevent removal of the loading device from the meter when a recording card is not inserted in the loading device recording chute. Thus the user may take an impression of the position of the meter and loading device counter wheels before and after tranferring the load to the meter. Furthermore, by operating the loading device impression wheel carriage by the pin 334 (Figure 2), the clerk at the post office may make a record of the load placed therein for the post office records.

Thus, it will be seen that thoroughly practical and efficient mechanism for loading the meter of a metered mailing machine has been provided in which the several objects mentioned hereinabove, as well as many others, are successfully accomplished.

As many possible embodiments may be made of the mechanical features of this invention, and as many changes might be made in the embodiment above set forth, it is to be understood that all matter hereinbefore set forth, or shown in the accompanying drawings, is to be interpreted as illustrative and not in a limiting sense.

We claim:

1. In apparatus for printing postage on mailing matter, the combination of a metering device including a register adapted to have a supply of postage value set therein, said register including lockout mechanism operable to lock said metering device against operation when there is no available supply of postage value in said register, a loading device capable of being set at a predetermined sum by a post office official and then capable of being operated by a user for loading said sum into said register, manually operable means for operatively connecting said loading device to the register of said metering device, a lock actuated by the operation of said last-mentioned means for preventing operation of said metering device during loading, and a lock on said metering device to prevent removal of said loading device from said metering device until the sum has been completely loaded into said register.

2. In apparatus of the nature described, in combination, a metering device including a descending register which locks when zero position is reached, a loading device capable of being loaded with a predetermined sum, means for loading the sum set on said loading device into said metering device register, means detachably mounting said loading device on said metering device, printing means for recording on a card the sum set in said loading device, and means preventing the detachment of said loading device from said metering device unless a recording card is positioned in said loading device.

3. In apparatus of the nature described, in combination, a metering device including a register having counter wheels, a loading device including a register having counter wheels, means for transferring a sum from said loading device register to said metering device register, and printing means for making a record on a single card of the positions of the counter wheels of both of said registers at the same time.

4. In apparatus of the nature described, in combination, a metering device, a loading device including a register, means permitting a post office official to set a sum in said loading device register which may be transferred to said metering device, printing means for making a record of the setting of said loading device register on a recording card, means for locking said loading device register as a result of said sum having been transferred to said metering device, means operative jointly with the operation of said printing means for locking said recording card on said loading device during the printing operation, and lock means controlling the release of both said loading device register and said recording card.

5. In apparatus of the nature described, in combination, a metering device, a loading device including a register with counter wheels, means permitting a post office official to set a sum in said loading device register to be transferred by the user to said metering device, printing means including a plurality of impression wheels each of which coacts with one of the digits on a counter wheel of said register to print a record of the setting thereof on a recording card positioned therebetween, and means for locking said printing means in printing position to lock said impression wheels in contact with the raised digits on said counter wheels whereby said recording card is locked on said loading device after said loading device has been unloaded.

6. In apparatus for printing postage on mailing matter, the combination of a metering device including a register adapted to have a supply of postage value set therein, said register including lockout mechanism operable to lock said metering device against operation when there is no available supply of postage value in said register, a loading device including a register, means permitting a post office official to load a sum in said loading device register to be transferred to said metering device register, means for detachably mounting said loading device on said metering device, printing means including a plurality of impression wheels each of which coacts with digits on the loading device register counter wheels to print a record of the setting of said loading device register on a recording card positioned between said impression wheels and said counter wheels, means for locking said printing means to lock said impression wheels in contact with the raised digits on said counter wheels whereby said recording card is locked on said loading device after a load has been transferred to said metering device register, and means to prevent locking of said printing means when a recording card is not positioned in said loading device.

7. In apparatus for printing postage on mailing matter, the combination of a metering device including a register adapted to have a supply of postage value set therein, said register including lockout mechanism operable to lock said metering device against operation when there is no available supply of postage value in said register, a loading device capable of being loaded with a predetermined sum, means detachably mounting said loading device on said metering device, manually operable means permitting a post office official to load a sum into said loading device, means for transferring said sum from said loading device to said register, and a lock preventing the operation of said metering device when said loading device is detached from said metering device.

8. In apparatus for printing postage on mailing matter, the combination of a metering device including a register adapted to have a supply of postage value set therein, said register including lockout mechanism operable to lock said metering device against operation when there is no available supply of postage value in said register, a loading device capable of being loaded with a predetermined sum, means detachably mounting said loading device on said metering device, manually operable means permitting a post office official to load a sum into said loading device, means for transferring said sum from said loading device to said register, manually operable means controlling the operation of said metering and loading devices, means controlled by said last-mentioned means for preventing the operation of said metering device during the transfer of said sum, means controlled by said manually operable means for conditioning said metering device for operation, and a lock controlled by said manually operable means for preventing the operation of said metering device when the loading device is detached from the metering device.

9. In apparatus for printing postage on mailing matter, the combination of a metering device including a register adapted to have a supply of postage value set therein, said register including lockout mechanism operable to lock said metering device against operation when there is no available supply of postage value in said register, means associated with said register to lock said metering device when said register reaches a predetermined setting, mechanism operated by the user detachably mounted on said metering device for loading a sum into said register, a control key on said mechanism, means on said metering device operated by said key for conditioning said register for loading, and manually operable means on said mechanism for loading said sum into said register.

10. In apparatus for printing postage on mailing matter, the combination of a metering device including a register adapted to have a supply of postage value set therein, said register including lockout mechanism operable to lock said metering device against operation when there is no available supply of postage value in said register, a loading device capable of being set at a predetermined sum by a post office official and operable by a user to load said sum into said register, means detachably mounting said loading device on said metering device, and a lock controlled by operation of said loading device to prevent operation of said metering device during the loading of said sum.

11. In apparatus for printing postage on mailing matter, the combination of a metering device including a register adapted to have a supply of postage value set therein, said register including lockout mechanism operable to lock said metering device against operation when there is no available supply of postage value in said register, a loading device including mechanism settable by a post office official and operable by a user to load a sum into said register, means detachably mounting said loading device on said metering device, means forming a driving connection between said loading device and said register, operable means on said loading device for transferring the load from said loading device to said register, a key on said loading device, a lock operated by said key preventing said driving connection from being completed unless said loading device is mounted on said metering device.

12. In apparatus for printing postage on mailing matter, the combination of a metering device including a register adapted to have a supply of postage value set therein, said register including lockout mechanism operable to lock said metering device against operation when there is no available supply of postage value in said register, a loading device including mechanism settable by a post office official and operable by a user to load a sum into said register, means detachably mounting said loading device on said metering device, key operated means for conditioning said register for loading, and separate key controlled means forming a driving connection between said loading device and said register.

13. In apparatus of the nature described, in combination, a metering device, a register associated with and controlling said metering device, a loading device operable to load a sum into said register, means detachably mounting said loading device on said metering device, means permitting a post office official to load a predetermined sum into said loading device, manually operable means operable by the user of the metering device for conditioning the register in said metering device for loading, lock means controlled by said last-mentioned means for preventing the operation of said metering device during loading, and manually operable means operatively connecting said loading device and said register for transferring said sum from said loading device into the register of said metering device when said loading device is mounted thereon.

14. In apparatus of the nature described, in combination, a metering device, a register associated with and controlling said metering device, a loading device, means detachably mounting said loading device on said metering device, means permitting a post office official to load a sum into said loading device, means operable by the user when said loading device is mounted on said metering device for conditioning said register for loading, a lock actuated by said last-mentioned means for preventing the operation of said metering device during loading, manually operable means for transferring said sum from the loading device to said register, and locking means on said loading device for preventing more than said sum from being transferred to said register.

15. In apparatus for printing postage on mailing matter, the combination of a metering device including a register adapted to have a supply of postage value set therein, said register including lockout mechanism operable to lock said metering device against operation when there is no available supply of postage value in said register, a loading device capable of being set by a post office official at a predetermined sum and of being operated by the user to transfer the sum to said register, means detachably mounting said loading device on said metering device, manually operable means for transferring said sum from said loading device to said register, lock controlled means for conditioning said register for the transfer, a key on said loading device for actuating said last-mentioned means, and a lock to prevent said key member being operated to free the loading device from the meter from the time it is used to condition said lock controlled means until the complete sum is transferred from the loading device to the meter device register.

16. In apparatus of the nature described, in combination, a metering device including a descending register which locks said metering device when said descending register reaches zero position, a loading device having a register settable by a post office official from which a sum may be transferred into said metering device register, printing means for making a record on a card of the setting of the registers of said loading device and said metering device, means locking said card to said loading device after printing, and post office lock controlled means for releasing said recording card.

17. In a device of the nature described, in combination, a metering device, said metering device being adapted to print postage stamps, a register on said metering device for showing the amount of postage standing in the machine, said register being settable to a predetermined sum, the value of each stamp being deducted from said sum as each stamp is printed, locking mechanism on said metering device for locking said metering device when said sum is exhausted, a loading device settable by a post office official at a predetermined sum, a register on said loading device, said register being settable by a post office official at a predetermined sum, means detachably mounting said loading device on said metering device, manually operable means forming a transfer connection between said register for transferring said sum from said loading device register to said metering device register, the counter wheels of said registers being positioned to permit a printing impression to be taken from them, means for pressing a recording card into contact with the counter wheels of both of said registers at the same time to print a record of the position of said counter wheels on said recording card, and means for locking said recording card to said loading device to prevent its removal therefrom after printing has been effected, whereby said recording card must be taken to the post office with said loading device when a new sum is to be set thereon.

18. In apparatus for printing postage on mailing matter, the combination of a metering device including a register adapted to have a supply of postage value set therein, said register including lockout mechanism operable to lock said metering device against operation when there is no available supply of postage value in said register, a loading device capable of being set at a predetermined sum by a post office official and operable by the user to load said sum into said register, a pair of mounting pins on said metering device, lock controlled means detachably mounting said loading device on said mounting pins, and a lock controlled by operation of said locking device to prevent operation of said metering device during the loading of said sum.

19. In apparatus of the nature described, in combination, a metering device including a register having counter wheels, a loading device including a register having counter wheels, means detachably mounting said loading device on said metering device, means permitting a post office official to set a predetermined sum in said loading device register, means for transferring said sum from said loading device register to said metering device register, printing means for making a record on a single recording card of the positions of the counter wheels of both registers after the sum has been transferred from the loading device register to the metering device register, and means for locking said recording card to said loading device during the printing operation.

20. In apparatus of the nature described, in combination, a metering device including a register having counter wheels, a loading device including a register having counter wheels, means detachably mounting said loading device on said metering device, means permitting a post office official to set a predetermined sum in said loading device register, means for transferring said sum from said loading device register to said metering device register, printing means for making a record on a single recording card of the positions of the counter wheels of both registers after the sum has been transferred from the loading device register to the metering device register, means for locking said recording card to said loading device during the printing operation, and means preventing the detachment of said loading device from said metering device unless a recording card is positioned in said loading device.

21. In apparatus of the nature described, in combination, a metering device including a register, a loading device including a register, means detachably mounting said loading device on said metering device, means permitting a post office official to set a sum in said loading device register which may be transferred to said metering device register, means for transferring said sum from said loading device register to said metering device register, printing means for making a record of the setting of said loading and metering device registers at the same time on a recording card, means for locking said loading device register as a result of said sum having been transferred to said metering device register, means operative jointly with the operation of said printing means for locking said recording card on said loading device during the printing operation, and lock means controlling the release of both said loading device register and said recording card.

22. In apparatus of the nature described, in combination, a metering device including a register, a loading device including a register, means detachably mounting said loading device on said metering device, means permitting a post office official to set a sum in said loading device register which may be transferred to said metering device, means for transferring said sum from said loading device register to said metering device register, printing means for making a record of the setting of said loading and metering device registers on a recording card, means for locking said loading device register as a result of said sum having been transferred to said metering device register, means operative jointly with the operation of said printing means for locking said recording card on said loading device during the printing operation, lock means controlling the release of both said loading device register and said recording card, means preventing detachment of said loading device from said metering device unless a recording card is positioned in said loading device, and means preventing operation of said printing means when a card is not positioned in printing position on said loading device.

23. In apparatus for printing postage on mailing matter, the combination of a metering device including a register adapted to have a supply of postage value set therein, said register including lockout mechanism operable to lock said metering device against operation when there is no available supply of postage value in said register, a loading device for loading a predetermined sum into said register, said sum being set in said loading device by a post office official, means detachably mounting said loading device on said metering device, a key mounted on said loading device, locking mechanism on said metering device actuated by said key prior to loading for locking said metering device against operation, mechanism actuated by said key after it locks said metering device for disconnecting said register from said metering device thereby conditioning it for loading, and manually operable means on said loading device forming the transferring connection between said loading device and said register.

24. In apparatus for printing postage on mailing matter, the combination of a metering device including a register adapted to have a supply of postage value set therein, said register including lockout mechanism operable to lock said metering device against operation when there is no available supply of postage value in said register, a loading device capable of being set at a predetermined sum by a post office official and operable by a user to load said sum into said register, means detachably mounting said loading device on said metering device, conditioning mechanism on said metering device for conditioning the register of said metering device for loading, locking mechanism on said metering device for preventing operation of said metering device during loading, and a key on said loading device operably connected to said conditioning and locking mechanisms when said loading device is mounted on said metering device, said key upon actuation acting through said conditioning and locking mechanisms to condition said register for loading and to lock said meter against operation.

15. In apparatus for printing postage on mailing matter, the combination of a metering device including a register adapted to have a supply of postage value set therein, said register including lockout mechanism operable to lock said metering device against operation when there is no available supply of postage value in said register, means associated with said register to lock said metering device when said register reaches a predetermined setting, mechanism operated by the user detachably mounted on said metering device for loading a sum into said register, a control key on said mechanism, means on said metering device operated by said key for conditioning said register for loading, manually operable means on said mechanism for loading said sum into said register, and lock means preventing removal of said mechanism from said metering device until said sum has been completely transferred.

26. In a device of the nature described, in combination, a metering device, said metering device being adapted to print postage stamps, a descending register on said metering device for registering the values of the stamps printed, said register being settable to a predetermined sum, the value of each stamp being deducted from said sum as each stamp is printed, locking mechanism on said metering device for locking said metering device when said sum is exhausted, a loading device settable by a post office official at a predetermined sum, a register on said loading device, said register being settable by a post office official at a predetermined sum, means detachably mounting said loading device on said metering device, a transfer shaft including a section on said loading device and a section on said metering device, means connecting one section of said transfer shaft to said loading device register, means connecting the other section of said transfer shaft to said metering device register, a key on one of said shaft sections, a lock on the other of said shaft sections locking said shaft section against rotation, said key opening said lock when said sections are connected to free said shaft, and manually operable means for effecting transfer of said sum through said transfer shaft.

27. In a device of the nature described, in combination, a metering device, said metering device being adapted to print postage stamps, a descending register on said metering device for registering the values of the stamps printed, said register being settable to a predetermined sum, the value of each stamp being deducted from said sum as each stamp is printed, locking mechanism on said metering device for locking said metering device when said sum is exhausted, a loading device settable by a post office official at a predetermined sum, a register on said loading device, said register being settable by a post office official at a predetermined sum, means detachably mounting said loading device on said metering device, manually operable means forming a transfer connection between said registers for transferring said sum from said loading device register to said metering device register, key means on said loading device, lock means on said metering device which prevents operation of said metering device when said lock means is in locked position, and means for conditioning said metering device register for loading, said key means being operable when said loading device is mounted on said metering device to move said lock means to locked position and also being operable to actuate said metering device register conditioning means, said lock means being actuated prior to said conditioning means to lock said metering device against operation during loading.

COMMODORE D. RYAN.
EDWARD P. DRAKE.

REFERENCES CITED

The following references are of record in the file of this patent:

UNITED STATES PATENTS

| Number | Name | Date |
| --- | --- | --- |
| 888,781 | Bowlus | May 26, 1908 |
| 1,454,108 | Dixon et al. | May 8, 1923 |
| 1,954,694 | Friedrichs | Apr. 10, 1934 |
| 1,984,141 | Komusin | Dec. 11, 1934 |
| 2,052,485 | Ogden | Aug. 25, 1936 |
| 2,104,624 | Royce et al. | Jan. 4, 1938 |